(12) United States Patent
Sasaki

(10) Patent No.: US 6,519,834 B1
(45) Date of Patent: Feb. 18, 2003

(54) METHOD OF MANUFACTURING THIN-FILM MAGNETIC HEAD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 398 days.

(21) Appl. No.: 09/602,890

(22) Filed: Jun. 23, 2000

(30) Foreign Application Priority Data

Jul. 14, 1999 (JP) ............................................ 11-199850

(51) Int. Cl.[7] .............................................. G11B 5/127
(52) U.S. Cl. ................................ 29/603.14; 29/603.16; 29/603.15
(58) Field of Search .......................... 29/603.14, 603.15, 29/603.16, 603.13, 603.07, 603.01; 360/126

(56) References Cited

U.S. PATENT DOCUMENTS

| | | | |
|---|---|---|---|
| 5,438,747 A | | 8/1995 | Krounbi et al. |
| 5,465,475 A | * | 11/1995 | Kinoshita et al. ......... 29/603.16 |
| 5,966,800 A | * | 10/1999 | Huai et al. ............... 29/603.13 |
| 6,032,353 A | * | 3/2000 | Hiner et al. ............. 29/603.14 |
| 6,209,192 B1 | * | 4/2001 | Urai et al. ............... 29/603.13 |
| 6,289,578 B1 | * | 9/2001 | Kamijima ................. 29/603.14 |

FOREIGN PATENT DOCUMENTS

| | | |
|---|---|---|
| JP | 60-10409 | 1/1985 |
| JP | 62-245509 | 10/1987 |
| JP | 7-262519 | 10/1995 |

* cited by examiner

Primary Examiner—Gregory M. Vidovich
Assistant Examiner—Stephen Kenny
(74) Attorney, Agent, or Firm—Oliff & Berridge, PLC

(57) ABSTRACT

A method of manufacturing a recording head having a bottom pole layer and a top pole layer that include pole portions opposed to each other, a recording gap layer being placed between the pole portions. The top pole layer is made up of a pole portion layer, a magnetic layer and a yoke portion layer. The recording head further has an insulating layer for defining a throat height placed between the pole layers, and a thin-film coil placed between the pole layers, the coil being insulated from the pole layers. The pole portion layer is formed through the following procedure. A magnetic film is formed on a surface having a step caused by the insulating layer. The top surface of the magnetic film is flattened. The magnetic film thus flattened is patterned through photolithography.

24 Claims, 15 Drawing Sheets

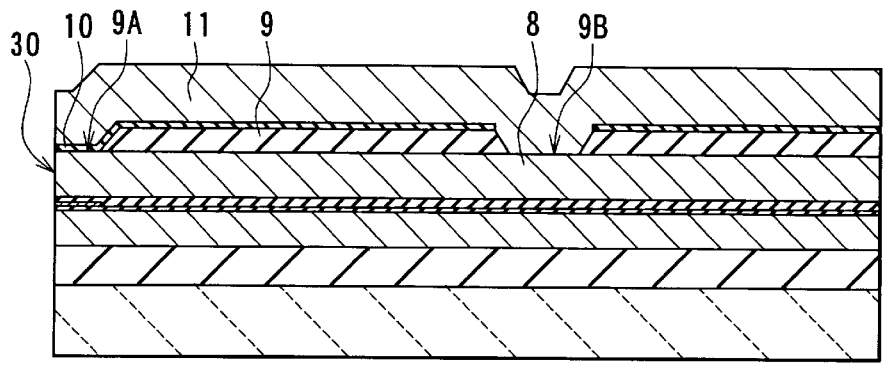 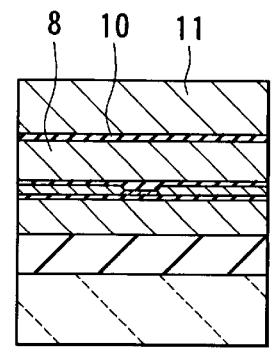
FIG. 3A　　　　　　　　FIG. 3B
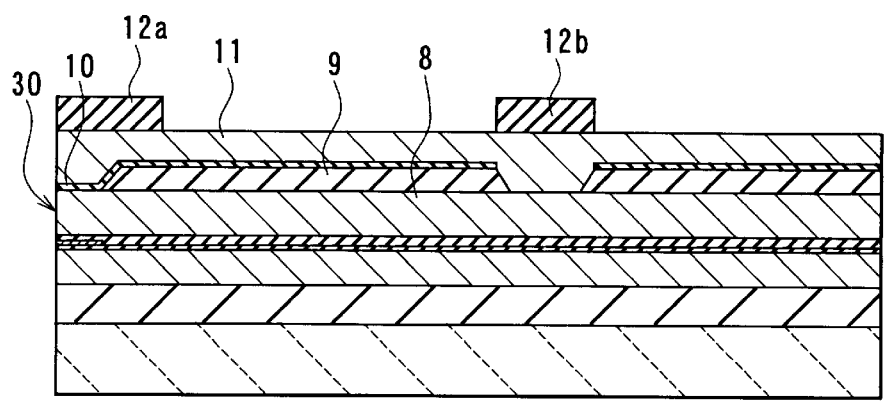 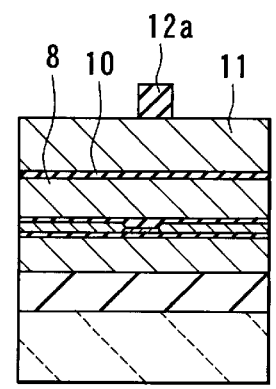
FIG. 4A　　　　　　　　FIG. 4B

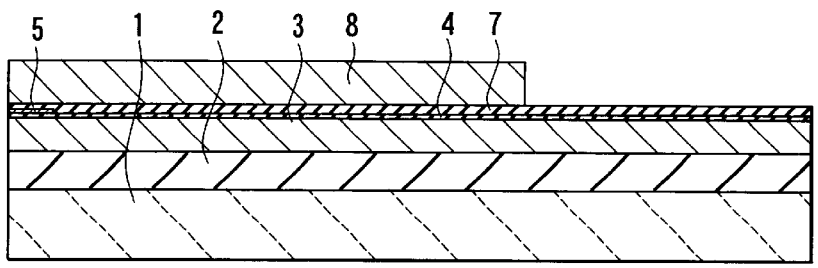
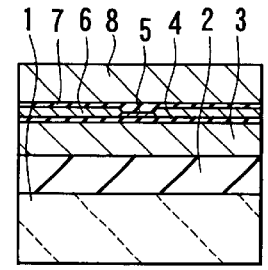
FIG. 9A  FIG. 9B
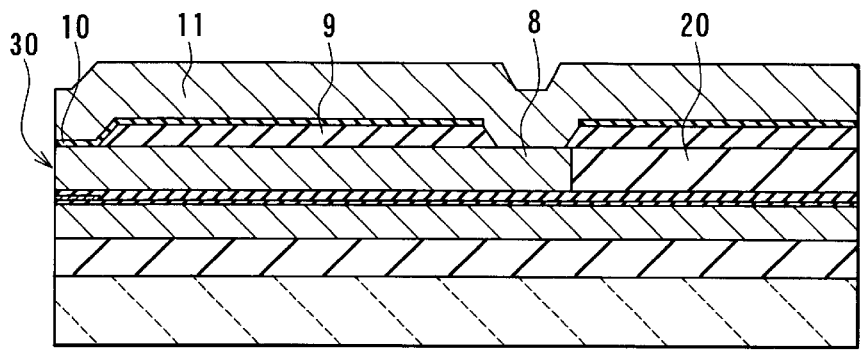
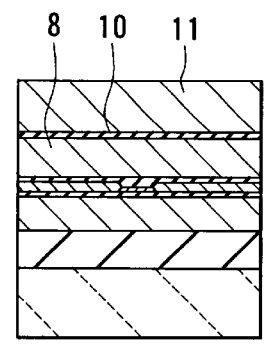
FIG. 10A  FIG. 10B

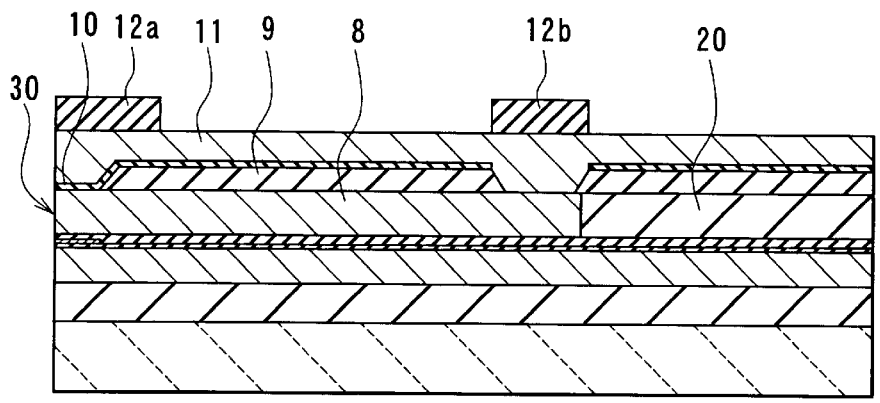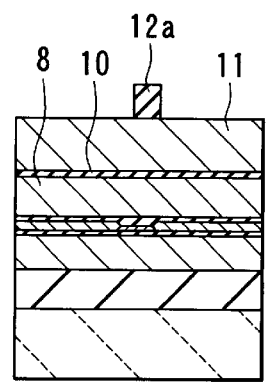
FIG. 11A     FIG. 11B
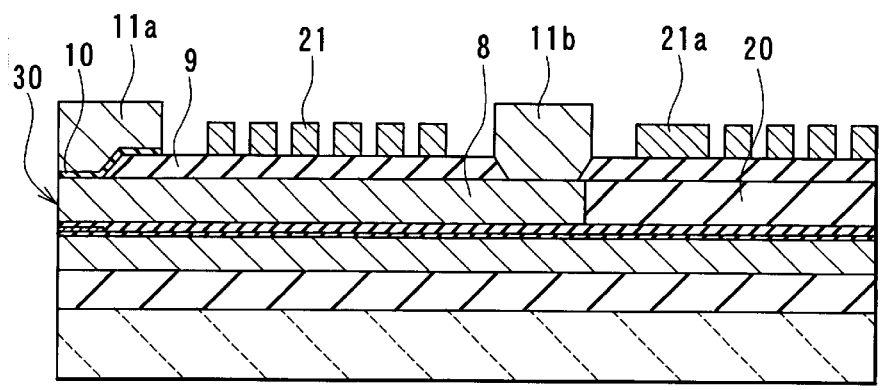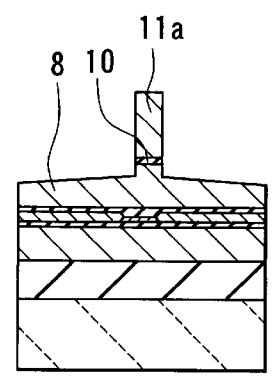
FIG. 12A     FIG. 12B

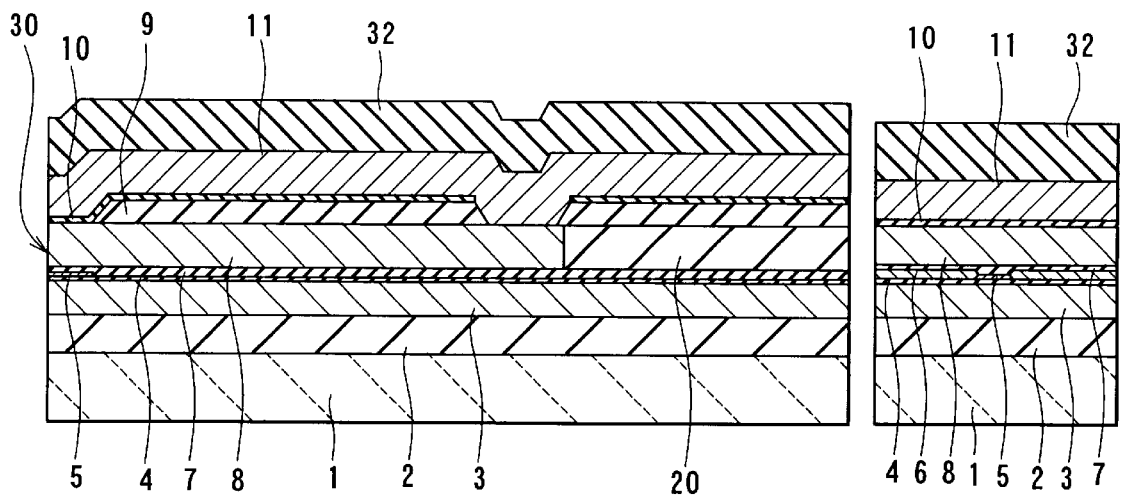
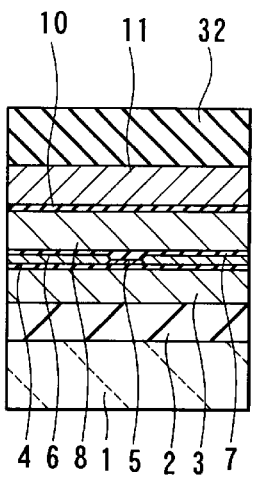
FIG. 16A      FIG. 16B
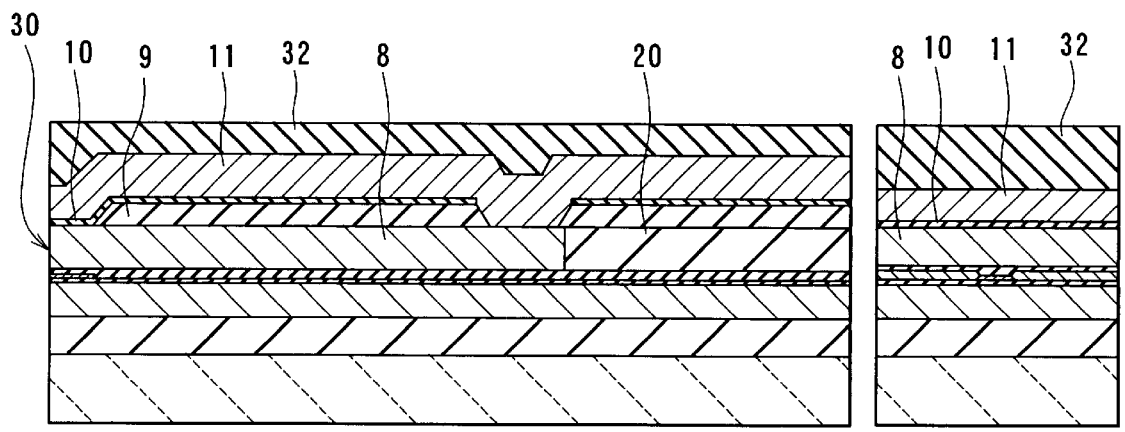
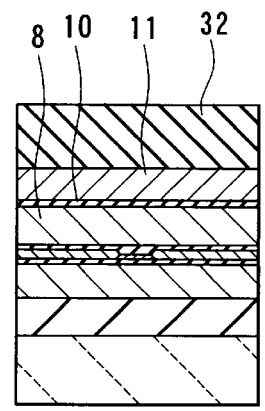
FIG. 17A      FIG. 17B

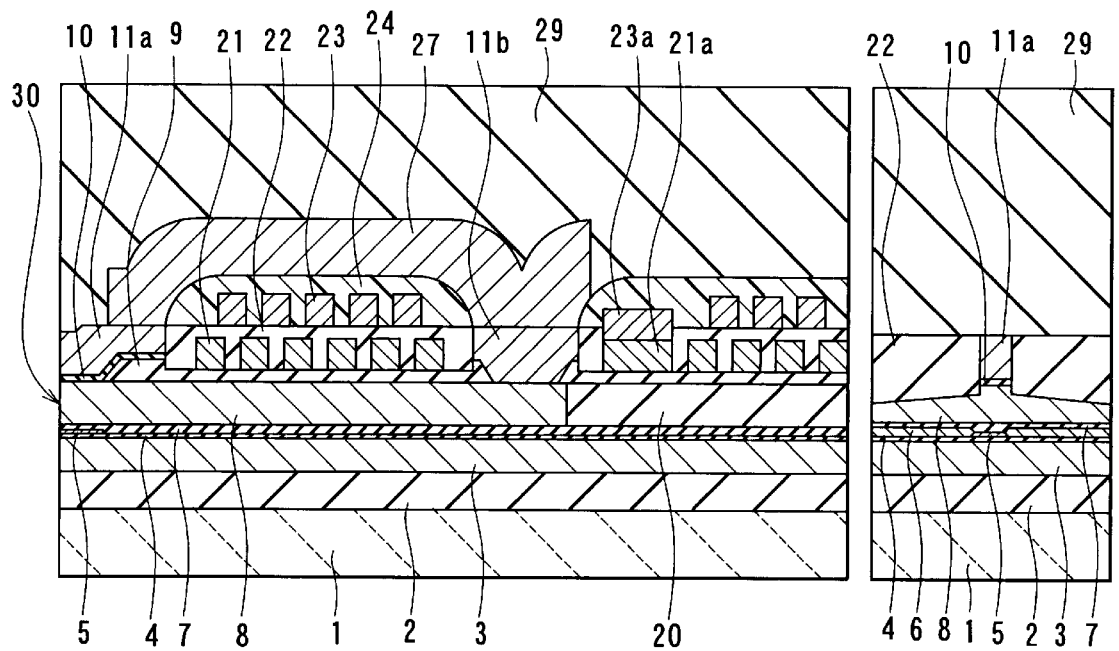
FIG. 20A   FIG. 20B
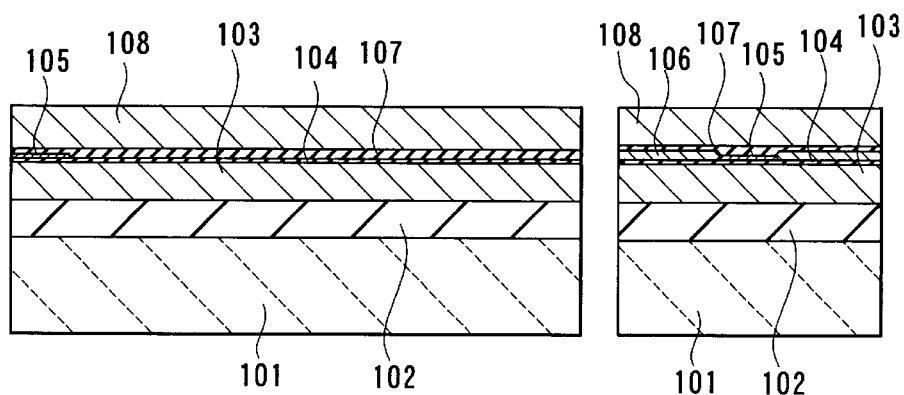
FIG. 21A
RELATED ART
FIG. 21B
RELATED ART

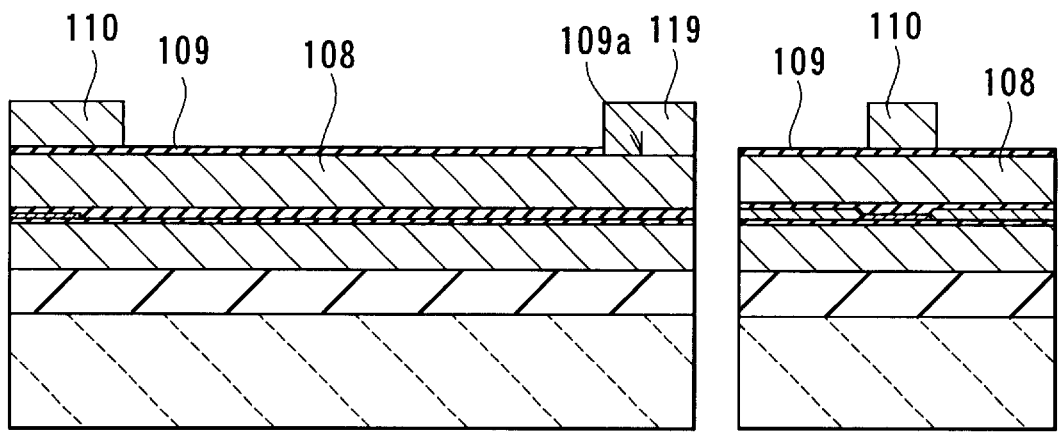
FIG. 22A
RELATED ART
FIG. 22B
RELATED ART
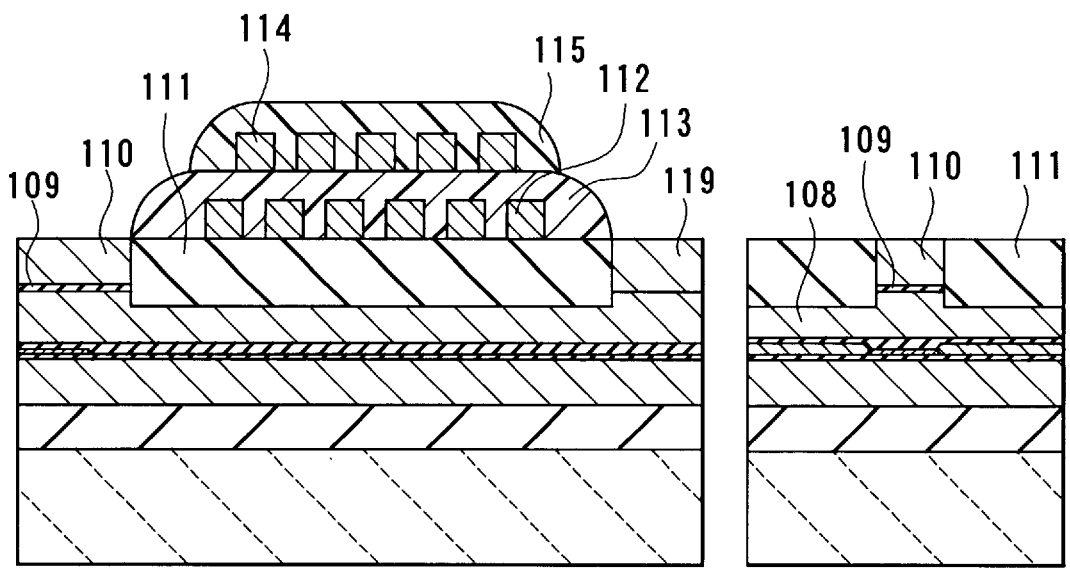
FIG. 23A
RELATED ART
FIG. 23B
RELATED ART

METHOD OF MANUFACTURING THIN-FILM MAGNETIC HEAD

BACKGROUND OF THE INVENTION

1. Field of the Invention

The present invention relates to a method of manufacturing a thin-film magnetic head having at least an induction-type magnetic transducer.

2. Description of the Related Art

Performance improvements in thin-film magnetic heads have been sought as surface recording density of hard disk drives has increased. Such thin-film magnetic heads include composite thin-film magnetic heads that have been widely used. A composite head is made of a layered structure including a recording head having an induction-type magnetic transducer for writing and a reproducing head having a magnetoresistive (MR) element for reading.

It is required to increase the track density on a magnetic recording medium in order to increase recording density among the performance characteristics of a recording head. To achieve this, it is required to implement a recording head of a narrow track structure wherein the width of top and bottom poles sandwiching the recording gap layer on a side of the air bearing surface is reduced down to microns or the order of submicron. Semiconductor process techniques are utilized to implement such a structure.

Reference is now made to FIG. 21A to FIG. 24A and FIG. 21B to FIG. 24B to describe an example of a method of manufacturing a composite thin-film magnetic head as an example of a related-art method of manufacturing a thin-film magnetic head. FIG. 21A to FIG. 24A are cross sections each orthogonal to an air bearing surface of the thin-film magnetic head. FIG. 21B to FIG. 24B are cross sections of a pole portion of the head each parallel to the air bearing surface.

In the manufacturing method, as shown in FIG. 21A and FIG. 21B, an insulating layer 102 made of alumina ($Al_2O_3$), for example, having a thickness of about 5 to 10 $\mu$m is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, on the bottom shield layer 103, alumina, for example, is deposited to a thickness of 100 to 200 nm through sputtering to form a bottom shield gap film 104 as an insulating layer. On the bottom shield gap film 104 an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 is formed as an insulating layer on the bottom shield gap film 104 and the MR element 105. The MR element 105 is embedded in the shield gap films 104 and 107.

Next, on the top shield gap film 107, a top-shield-layer-cum-bottom-pole-layer (called a bottom pole layer in the following description) 108 having a thickness of about 3 $\mu$m is formed. The bottom pole layer 108 is made of a magnetic material and used for both a reproducing head and a recording head.

Next, as shown in FIG. 22A and FIG. 22B, on the bottom pole layer 108, a recording gap layer 109 made of an insulating film such as an alumina film whose thickness is 0.2 $\mu$m is formed. Next, a portion of the recording gap layer 109 is etched to form a contact hole 109a to make a magnetic path. On the recording gap layer 109 in the pole portion, a top pole tip 110 made of a magnetic material and having a thickness of 0.5 to 1.0 $\mu$m is formed for the recording head. At the same time, a magnetic layer 119 made of a magnetic material is formed for making the magnetic path in the contact hole 109a for making the magnetic path.

Next, as shown in FIG. 23A and FIG. 23B, the recording gap layer 109 and the bottom pole layer 108 are etched through ion milling, using the top pole tip 110 as a mask. As shown in FIG. 23B, the structure is called a trim structure wherein the sidewalls of the top pole (the top pole tip 110), the recording gap layer 109, and part of the bottom pole layer 108 are formed vertically in a self-aligned manner.

Next, an insulating layer 111 made of an alumina film, for example, and having a thickness of about 3 $\mu$m is formed on the entire surface. The insulating layer 111 is then polished to the surfaces of the top pole tip 110 and the magnetic layer 119 and flattened.

Next, on the flattened insulating layer 111, a first layer 112 of a thin-film coil is made of copper (Cu), for example, for the induction-type recording head. Next, a photoresist layer 113 is formed into a specific shape on the insulating layer 111 and the first layer 112. Heat treatment is then performed at a specific temperature to flatten the surface of the photoresist layer 113. On the photoresist layer 113, a second layer 114 of the thin-film coil is then formed. Next, a photoresist layer 115 is formed into a specific shape on the photoresist layer 113 and the second layer 114. Heat treatment is then performed at a specific temperature to flatten the surface of the photoresist layer 115.

Next, as shown in FIG. 24A and FIG. 24B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, machine processing of the slider is performed to form the air bearing surface 118 of the thin-film magnetic head including the recording head and the reproducing head. The thin-film magnetic head is thus completed.

FIG. 25 is a top view of the thin-film magnetic head shown in FIG. 24A and FIG. 24B. The overcoat layer 117 and the other insulating layers and insulating films are omitted in FIG. 25.

In FIG. 24A, 'TH' indicates the throat height and 'MR-H' indicates the MR height. The throat height is the length (height) of portions of magnetic pole layers facing each other with a recording gap layer in between, between the air-bearing-surface-side end and the other end. The MR height is the length (height) between the air-bearing-surface-side end of the MR element and the other end. In FIG. 24B, 'P2W' indicates the pole width, that is, the recording track width. In addition to the throat height, the MR height and so on, the apex angle as indicated with θ in FIG. 24A is one of the factors that determine the performance of a thin-film magnetic head. The apex is a hill-like raised portion of the coil covered with the photoresist layers 113 and 115. The apex angle is the angle formed between the top surface of the insulating layer 111 and the straight line drawn through the edges of the pole-side lateral walls of the apex.

In order to improve the performance of the thin-film magnetic head, it is important to precisely form throat height TH, MR height MR-H, apex angle θ, and recording track width P2W as shown in FIG. 24A and FIG. 24B.

To achieve high surface recording density, that is, to fabricate a recording head with a narrow track structure, it has been particularly required that track width P2W fall within the submicron order of 1.0 μm or less. It is therefore required to process the top pole into the submicron order through semiconductor process techniques.

A problem is that it is difficult to form the top pole layer of small dimensions on the apex.

As disclosed in Published Unexamined Japanese Patent Application Hei 7-262519 (1995), for example, frame plating may be used as a method for fabricating the top pole layer. In this case, a thin electrode film made of Permalloy, for example, is formed by sputtering, for example, to fully cover the apex. Next, a photoresist is applied to the top of the electrode film and patterned through a photolithography process to form a frame to be used for plating. The top pole layer is then formed by plating through the use of the electrode film previously formed as a seed layer.

However, there is a difference in height between the apex and the other part, such as 7 to 10 μm or more. The photoresist whose thickness is 3 to 4 μm is applied to cover the apex. If the photoresist thickness is required to be at least 3 μm over the apex, a photoresist film having a thickness of 8 to 10 μm or more, for example, is formed below the apex since the fluid photoresist goes downward.

To implement a recording track width of the submicron order as described above, it is required to form a frame pattern having a width of the submicron order through the use of a photoresist film. Therefore, it is required to form a fine pattern of the submicron order on top of the apex through the use of a photoresist film having a thickness of 8 to 10 μm or more. However, it is extremely difficult to form a photoresist pattern having such a thickness into a reduced pattern width, due to restrictions in a manufacturing process.

Furthermore, rays of light used for exposure of photolithography are reflected off the base electrode film as the seed layer. The photoresist is exposed to the reflected rays as well and the photoresist pattern may go out of shape. It is therefore impossible to obtain a sharp and precise photoresist pattern.

As thus described, it is difficult in prior art to fabricate the top pole layer with accuracy if the pole width of the submicron order is required.

To overcome the problems thus described, a method has been taken, as shown in the foregoing related-art manufacturing steps illustrated in FIG. 22A to FIG. 24A and FIG. 22B to FIG. 24B. In this method, a track width of 1.0 μm or less is formed through the use of the top pole tip 110 effective for making a narrow track of the recording head. The top pole layer 116 to be a yoke portion connected to the top pole tip 110 is then fabricated (as disclosed in Published Unexamined Japanese Patent Application Sho 62-245509 [1987] and Published Unexamined Japanese Patent Application Sho 60-10409 [1985]). That is, the ordinary top pole layer is divided into the top pole tip 110 and the top pole layer 116 to be the yoke portion in this method. As a result, it is possible that the top pole tip 110 that defines the track width is formed into small dimensions to some degree on the flat top surface of the recording gap layer 109.

However, the following problems are still found in the thin-film magnetic head having a structure as shown in FIG. 24A and FIG. 24B.

In the thin-film magnetic head shown in FIG. 24A and FIG. 24B, the recording track width and the throat height are defined by the top pole tip 110. Therefore, if the recording track width is extremely reduced, that is, down to 0.5 μm or less, in particular, the size of the top pole tip 110 is thus extremely reduced. As a result, pattern edges may be rounded and it is difficult to form the top pole tip 110 with accuracy. Therefore, the thin-film magnetic head having the structure as shown in FIG. 24A and FIG. 24B has a problem that it is difficult to precisely control the recording track width if the recording track width is extremely reduced.

In the thin-film magnetic head shown in FIG. 24A and FIG. 24B, the recording track width is defined by the top pole tip 110. Therefore, it is not necessary that the top pole layer 116 is processed into dimensions as small as those of the top pole tip 110. However, if the recording track width is extremely reduced, that is, down to 0.5 μm or less, in particular, processing accuracy for achieving the submicron-order width is required for the top pole layer 116, too. However, the top pole layer 116 is formed on top of the apex in the head shown in FIG. 24A and FIG. 24B. Therefore, it is difficult to reduce the top pole layer 116 in size, due to the reason described above. In addition, the top pole layer 116 is required to be greater than the top pole tip 110 in width since the top pole layer 116 is required to be magnetically connected to the top pole tip 110 smaller in width. Because of these reasons, the top pole layer 116 is greater than the top pole tip 110 in width in this thin-film magnetic head. In addition, the end face of the top pole layer 116 is exposed from the air bearing surface. As a result, writing may be performed by the thin-film magnetic head on a side of the top pole layer 116, too, and so-called 'side write' may result, that is, data is written in a region of a recording medium where data is not supposed to be written. Such a problem more frequently results when the coil is two-layer or three-layer to improve the performance of the recording head and the apex is thereby increased in height, compared to the case where the coil is one-layer.

Furthermore, in a prior-art magnetic head, it is difficult to reduce the magnetic path (yoke) length. That is, if the coil pitch is reduced, a head with a reduced yoke length is achieved and a recording head having an excellent high frequency characteristic is achieved, in particular. However, if the coil pitch is reduced to the limit, the distance between the zero throat height position (the position of an end of the pole portion opposite to the air bearing surface) and the outermost end of the coil is a major factor that prevents a reduction in yoke length. Since the yoke length of a two-layer coil can be shorter than that of a single-layer coil, a two-layer coil is adopted to many of recording heads for high frequency application. However, in the prior-art magnetic head, a photoresist film having a thickness of about 2 μm is formed to provide an insulating film between coil layers after a first layer is formed. Consequently, a small and rounded apex is formed at the outermost end of the first layer of the coil. A second layer of the coil is then formed on the apex. The second layer is required to be formed on a flat portion since it is impossible to etch the seed layer of the coil in the sloped portion of the apex, and the coil is thereby shorted.

Therefore, if the total coil thickness is 2 to 3 μm, the thickness of the insulating film between the layers of the coil is 2 μm, and the apex angle is 45 to 55 degrees, for example, the yoke length is required to be 6 to 8 μm which is twice as long as the distance between the outermost end of the coil and the neighborhood of the zero throat height position, that is, 3 to 4 μm (the distance between the innermost end of the coil and the portion where the top and bottom pole layers are in contact with each other is required to be 3 to 4 μm, too), in addition to the length of the portion corresponding to the coil. This length of the portion other than the portion corresponding to the coil is one of the factors that prevent a reduction in yoke length.

Assuming that a two-layer eleven-turn coil in which the line width is 1.2 $\mu$m and the space is 0.8 $\mu$m is fabricated, for example, the portion of the yoke length corresponding to the first layer 112 of the coil is 11.2 $\mu$m, if the first layer is made up of six turns and the second layer is made up of 5 turns, as shown in FIG. 24A and FIG. 24B. In addition to this length, the total of 6 to 8 $\mu$m, that is, the distance between each of the outermost and innermost ends of the first layer 112 of the coil and each of ends of the photoresist layer 113 for insulating the first layer 112, is required for the yoke length. Therefore, the yoke length is 17.2 to 19.2 $\mu$m. If an 11-turn coil is made up of one layer, the yoke length is 27.2 to 29.2 $\mu$m. In the present patent application, the yoke length is the length of a portion of the pole layer except the pole portion and the contact portions, as indicated with $L_0$ in FIG. 24A. As thus described, it is difficult in the prior art to further reduce the yoke length, which prevents improvements in high frequency characteristic.

OBJECTS AND SUMMARY OF THE INVENTION

It is a first object of the invention to provide a method of manufacturing a thin-film magnetic head for precisely controlling a track width of an induction-type magnetic transducer even when the track width is reduced.

In addition to the first object, it is a second object of the invention to provide a method of manufacturing a thin-film magnetic head for preventing writing of data in a region where data is not supposed to be written.

In addition to the first object, it is a third object of the invention to provide a method of manufacturing a thin-film magnetic head for achieving a reduction in yoke length.

A first or second method of the invention is provided for manufacturing a thin-film magnetic head comprising: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; an insulating layer for defining a throat height, the insulating layer being placed between the first and second magnetic layers; and a thin-film coil at least a part of which is placed between the first and second magnetic layers, the at least part of the coil being insulated from the first and second magnetic layers.

The first method of the invention includes the steps of: forming the first magnetic layer; forming the insulating layer for defining the throat height on the first magnetic layer; forming the gap layer on the pole portion of the first magnetic layer; forming the second magnetic layer on the insulating layer for defining the throat height and the gap layer; and forming the coil such that the at least part of the coil is placed between the first and second magnetic layers, the at least part of the coil being insulated from the first and second magnetic layers. The step of forming the second magnetic layer includes the steps of: forming a magnetic film on the insulating layer for defining the throat height and the gap layer; flattening a top surface of the magnetic film; and patterning the flattened magnetic film through photolithography to make the magnetic film into at least the pole portion of the second magnetic layer.

In the first method of the invention the magnetic film is formed on the insulating layer for defining the throat height and the gap layer. The top surface of the magnetic film is flattened. The magnetic film flattened is patterned through photolithography, so that the magnetic film is made into at least the pole portion of the second magnetic layer.

According to the first method of the invention, the step of forming the insulating layer for defining the throat height on the first magnetic layer includes the case in which another layer is provided between the first magnetic layer and the insulating layer. The step of forming the second magnetic layer on the insulating layer and the gap layer includes the case in which another layer, such as the gap layer, is provided between the insulating layer and the second magnetic layer.

The second method of the invention includes the steps of: forming the first magnetic layer; forming the insulating layer for defining the throat height on the first magnetic layer; forming the gap layer on the pole portion of the first magnetic layer; forming the second magnetic layer on the insulating layer for defining the throat height and the gap layer; and forming the coil such that the at least part of the coil is placed between the first and second magnetic layers, the at least part of the coil being insulated from the first and second magnetic layers. The step of forming the second magnetic layer includes the steps of: forming a magnetic film on the insulating layer for defining the throat height and the gap layer; forming a masking film on the magnetic film, the masking film being made of a material for making an etching mask; flattening a top surface of the masking film; forming an etching mask used for making the magnetic film into at least the pole portion of the second magnetic layer, the etching mask being formed by patterning the flattened masking film through photolithography; and patterning the magnetic film through the use of the etching mask to make the magnetic film into at least the pole portion of the second magnetic layer.

In the second method of the invention the magnetic film is formed on the insulating layer for defining the throat height and the gap layer. On the magnetic film the masking film made of a material for making the etching mask is formed. The top surface of the masking film is flattened. The masking film flattened is then patterned through photolithography to form the etching mask used for making the magnetic film into at least the pole portion of the second magnetic layer. The magnetic film is patterned through the use of the etching mask, so that the magnetic film is made into at least the pole portion of the second magnetic layer.

According to the second method of the invention, the step of forming the insulating layer for defining the throat height on the first magnetic layer includes the case in which another layer is provided between the first magnetic layer and the insulating layer. The step of forming the second magnetic layer on the insulating layer and the gap layer includes the case in which another layer, such as the gap layer, is provided between the insulating layer and the second magnetic layer.

According to the first or second method of the invention, the pole portion of the second magnetic layer may have a width equal to a track width.

According to the first method of the invention, in the step of flattening the top surface of the magnetic film, asperities in the top surface of the magnetic film resulting from the insulating layer for defining the throat height may be eliminated.

According to the second method of the invention, in the step of flattening the top surface of the masking film, asperities in the top surface of the masking film resulting from the insulating layer for defining the throat height may be eliminated.

According to the first method, the step of forming the second magnetic layer may include the steps of: forming a pole portion layer including the pole portion of the second magnetic layer; and forming a yoke portion layer to be a yoke portion, the yoke portion layer being connected to the pole portion layer. In addition, the step of forming the pole portion layer may include the steps of: forming the magnetic film; flattening the top surface of the magnetic film; and patterning the magnetic film.

According to the second method, the step of forming the second magnetic layer may include the steps of: forming a pole portion layer including the pole portion of the second magnetic layer; and forming a yoke portion layer to be a yoke portion, the yoke portion layer being connected to the pole portion layer. In addition, the step of forming the pole portion layer may include the steps of: forming the magnetic film; forming the masking film; flattening the top surface of the masking film; forming the etching mask; and patterning the magnetic film.

According to the first or second method, an end face of the yoke portion layer that faces toward the medium facing surface may be located at a distance from the medium facing surface in the step of forming the yoke portion layer.

According to the first or second method, at least part of the thin-film coil may be placed on a side of the pole portion layer in the step of forming the thin-film coil.

The first or second method may further include the step of forming an additional insulating layer that covers at least part of the coil placed on the side of the pole portion layer and has a surface facing the yoke portion layer, the surface being flattened together with a surface of the pole portion layer facing the yoke portion layer.

According to the first or second method, the step of patterning the magnetic film may include: formation of the pole portion layer by etching the magnetic film through the use of an etching mask; and formation of a coil encasing portion in which the at least part of the coil is placed, the coil encasing portion being formed by etching the insulating layer for defining the throat height through the use of the etching mask.

According to the first method, the top surface of the magnetic film may be flattened through chemical mechanical polishing using a slurry including alumina in the step of flattening.

According to the second method, the top surface of the masking film may be flattened through chemical mechanical polishing using a slurry including alumina in the step of flattening.

According to the first or second method, the gap layer may be an alumina film formed through chemical vapor deposition.

The first or second method may further include the step of forming: a magnetoresistive element; a first shield layer and a second shield layer for shielding the magnetoresistive element, portions of the first and second shield layers located in regions on a side of the medium facing surface being opposed to each other, the magnetoresistive element being placed between the portions of the shield layers; and a first insulating film placed between the magnetoresistive element and the first shield layer, and a second insulating film placed between the magnetoresistive element and the second shield layer. In this case, at least one of the first and second insulating films may be an alumina film formed through chemical vapor deposition.

Other and further objects, features and advantages of the invention will appear more fully from the following description.

BRIEF DESCRIPTION OF THE DRAWINGS

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 9A and FIG. 9B are cross sections for illustrating a step in a method of manufacturing a thin-film magnetic head of a second embodiment of the invention.

FIG. 10A and FIG. 10B are cross sections for illustrating a step that follows FIG. 9A and FIG. 9B.

FIG. 11A and FIG. 11B are cross sections for illustrating a step that follows FIG. 10A and FIG. 10B.

FIG. 12A and FIG. 12B are cross sections for illustrating a step that follows FIG. 11A and FIG. 11B.

FIG. 16A and FIG. 16B are cross sections for illustrating a step in a method of manufacturing a thin-film magnetic head of a third embodiment of the invention.

FIG. 17A and FIG. 17B are cross sections for illustrating a step that follows FIG. 16A and FIG. 16B.

FIG. 20A and FIG. 20B are cross sections of the thin-film magnetic head fabricated through the method of the third embodiment.

FIG. 21A and FIG. 21B are cross sections for illustrating a step in a method of manufacturing a thin-film magnetic head of related art.

FIG. 22A and FIG. 22B are cross sections for illustrating a step that follows FIG. 21A and FIG. 21B.

FIG. 23A and FIG. 23B are cross sections for illustrating a step that follows FIG. 22A and FIG. 22B.

DETAILED DESCRIPTION OF THE PREFERRED EMBODIMENTS

Preferred embodiments of the invention will now be described in detail with reference to the accompanying drawings.

First Embodiment

Reference is now made to FIG. 1A to FIG. 7A, FIG. 1B to FIG. 7B, and FIG. 8 to describe a method of manufacturing a thin-film magnetic head of a first embodiment of the invention. FIG. 1A to FIG. 7A are cross sections each orthogonal to an air bearing surface. FIG. 1B to FIG. 7B are cross sections of the pole portion each parallel to the air bearing surface.

Figures 1A, 1B:
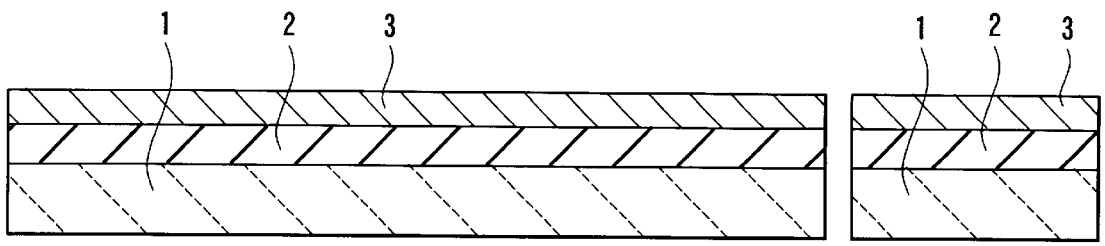
FIG. 1A and FIG. 1B are cross sections for illustrating a step in a method of manufacturing a thin-film magnetic head of a first embodiment of the invention.

In the manufacturing method, as shown in FIG. 1A and FIG. 1B, an insulating layer 2 made of alumina ($Al_2O_3$), for example, whose thickness is about 5 $\mu$m, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 $\mu$m is formed for making a reproducing head. The bottom shield layer 3 is formed through plating selectively on the insulating layer 2 with a photoresist film as a mask, for example. Next, although not shown, an insulating layer of alumina, for example, having a thickness of 4 to 5 $\mu$m, for example, is formed over the entire surface. This insulating layer is polished through chemical mechanical polishing (CMP), for example, so that the bottom shield layer 3 is exposed, and the surface is flattened.

Figures 2A, 2B:
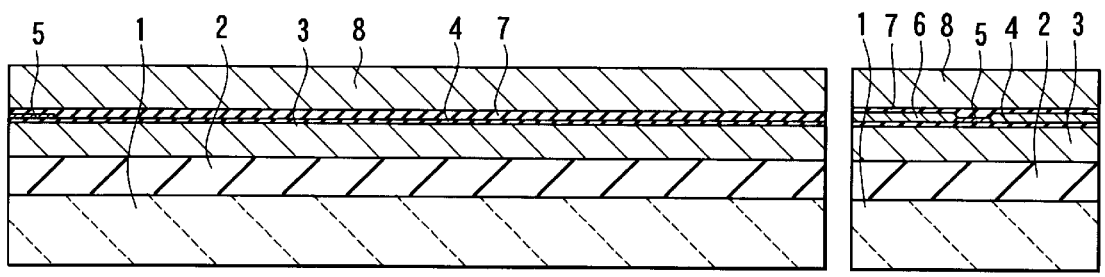
FIG. 2A and FIG. 2B are cross sections for illustrating a step that follows FIG. 1A and FIG. 1B.

Next, as shown in FIG. 2A and FIG. 2B, on the bottom shield layer 3, a bottom shield gap film 4 having a thickness of about 20 to 40 nm, for example, is formed as an insulating film. On the bottom shield gap film 4, an MR element 5 for reproduction having a thickness of tens of nanometers is formed. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulation material used for the shield gap films 4 and 7 may be any of alumina, aluminum nitride, diamond-like carbon (DLC), and so on. The shield gap films 4 and 7 may be fabricated through sputtering or chemical vapor deposition (CVD). If the shield gap films 4 and 7 made of alumina films are formed through CVD, trimethyl aluminum ($Al(CH_3)_3$) and $H_2O$, for example, are used. Through the use of CVD, it is possible to make the thin and precise shield gap films 4 and 7 with few pinholes.

Next, on the top shield gap film 7, a top-shield-layer-cum-bottom-pole-layer (called a bottom pole layer in the following description) 8 having a thickness of about 2.5 to 3.5 $\mu$m, for example, is selectively formed. The bottom pole layer 8 is made of a magnetic material and used for both a reproducing head and a recording head.

Next, as shown in FIG. 3A and FIG. 3B, an insulating layer 9 made of alumina, for example, and having a thickness of about 1 to 2 $\mu$m is formed over the entire surface. Next, portions of the insulating layer 9 are etched through reactive ion etching (RIE), for example. One of the portions is located at a point 9A to form the pole portion. The other portion is located at a point 9B corresponding to the center portion of a thin-film coil described later. Each of ends of the insulating layer 9 formed through this etching is tapered. This tapered portion forms an angle of 30 to 45 degrees with respect to the top surface of the bottom pole layer 8, for example. The insulating layer 9 thus etched corresponds to an insulating layer for defining a throat height of the invention. The zero throat height position is the position of an end of the insulating layer 9 facing toward the air bearing surface 30 (that is, on the left side of the accompanying cross-sectional views).

Next, a recording gap layer 10 made of an insulating material whose thickness is 0.15 to 0.25 $\mu$m, for example, is formed over the entire surface. In general, the insulating material used for the recording gap layer 10 may be alumina, aluminum nitride, a silicon-dioxide-base material, a silicon-nitride-base material, or diamond-like carbon (DLC) and so on. The recording gap layer 10 may be fabricated through sputtering or CVD. If the recording gap layer 10 made of an alumina film is formed through CVD, materials used are trimethyl aluminum ($Al(CH_3)_3$) and $H_2O$, for example. Through the use of CVD, it is possible to make the thin and precise recording gap layer 10 with few pinholes.

Next, a portion of the recording gap layer 10 located at the point 9B corresponding to the center portion of the thin-film coil is etched to form a contact hole for making the magnetic path.

Next, a magnetic film 11 made of a magnetic material and having a thickness of about 3.5 to 4.5 $\mu$m, for example, is formed over the entire surface. The magnetic film 11 is provided for forming the pole portion of top pole layer. When the magnetic film 11 is formed, asperities resulting from the insulating layer 9 are formed in the top surface of the magnetic film 11. The geometry of the magnetic film 11 is made greater than the geometries of layers that will be formed through etching the magnetic film 11. The magnetic film 11 may be made of NiFe (80 weight % Ni and 20 weight % Fe), or NiFe (45 weight % Ni and 55 weight % Fe) as a high saturation flux density material and formed into specific shapes through plating, or may be made of a material such as FeN or FeZrN as a high saturation flux density material through sputtering and selectively etched through ion milling, for example, into the specific shapes. Alternatively, a material such as CoFe or a Co-base amorphous material as a high saturation flux density material may be used.

Next, as shown in FIG. 4A and FIG. 4B, the top surface of the magnetic film 11 is flattened so as to remove the asperities in the top surface of the magnetic film 11 resulting from the insulating layer 9. This flattening process may be performed through CMP using a slurry including alumina.

Figures 5A, 5B:
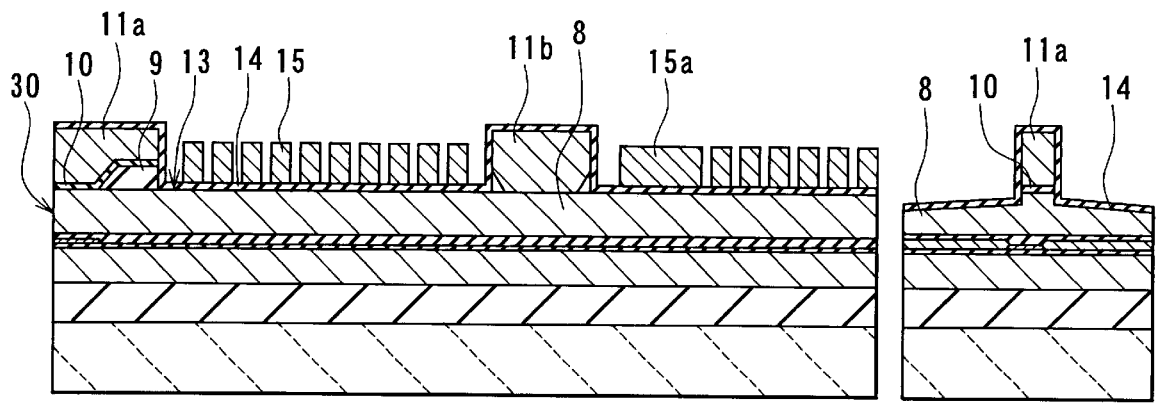
FIG. 5A and FIG. 5B are cross sections for illustrating a step that follows FIG. 4A and FIG. 4B.

Next, the flattened magnetic film 11 is patterned through photolithography, following the procedure described below, so that the pole portion of the top pole layer is made of the magnetic film 11. First, etching masks 12a and 12b are formed in the portion where the pole portion of the top pole layer is to be formed and in the portion where the top pole layer is connected to the bottom pole layer 8, respectively. The etching masks 12a and 12b may be any of photoresist masks, alumina films patterned through the use of photoresist masks, metal films formed through plating through the use of photoresist masks, and so on. Next, the magnetic film 11 is etched through ion milling using an argon-base gas, for example, to form a pole portion layer 11a making up the pole portion of the top pole layer, and a magnetic layer 11b connected to the bottom pole layer 8, as shown in FIG. 5A and FIG. 5B.

When the magnetic layer 11 is etched in this embodiment, portions of the recording gap layer 10 and the insulating layer 9 in a region where the thin-film coil described later is to be formed are etched, too. A coil encasing portion 13 in which the thin-film coil is placed is thereby formed. The bottom of the coil encasing portion 13 of this embodiment is the top surface of the bottom pole layer 8.

Next, the etching masks 12a and 12b are removed. The recording gap layer 10 is then selectively etched through dry etching, using the pole portion layer 11a as a mask. The dry etching may be RIE using a chlorine-base gas such as $BCl_2$ or $Cl_2$, or a fluorine-base gas such as $CF_4$ or $SF_6$, for example.

Next, the bottom pole layer 8 is selectively etched by about 0.3 to 0.4 μm, using the pole portion layer 11a as a mask, through ion milling using an argon-base gas, for example. A trim structure as shown in FIG. 5B is thus formed. The trim structure suppresses an increase in the effective track width due to expansion of a magnetic flux generated during writing in a narrow track.

Next, an insulating film 14 of alumina, for example, having a thickness of about 0.5 μm is formed over the entire surface. The insulating film 14 is provided for insulating the thin-film coil described later from the bottom pole layer 8. Next, the thin-film coil 15 made of copper (Cu), for example, is formed by a method such as frame plating on the insulating film 14 in the coil encasing portion 13. For example, the thickness of the coil 15 is about 1.0 to 2.0 μm and the pitch is 1.2 to 2.0 μm. The coil 15 is wound around the magnetic layer 11b. In FIG. 5A numeral 15a indicates a portion for connecting the coil 15 to a conductive layer (lead) described later.

Figures 6A, 6B:
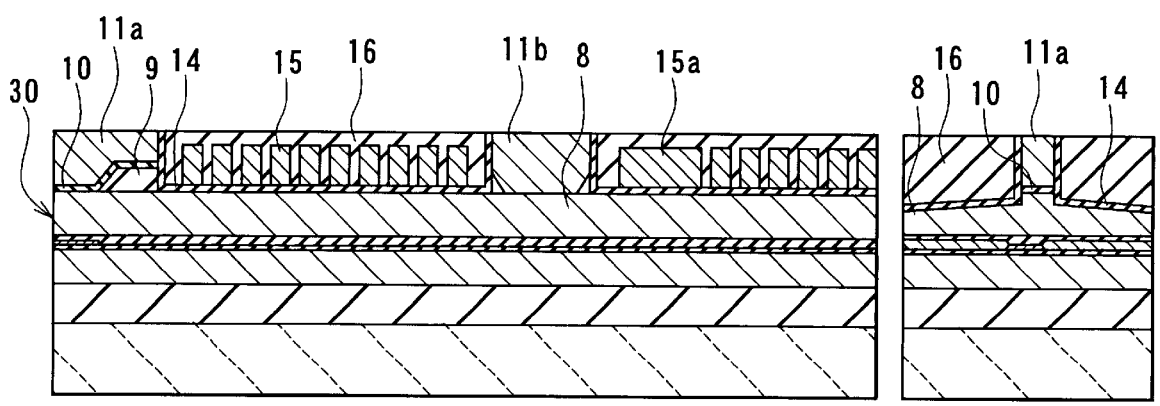
FIG. 6A and FIG. 6B are cross sections for illustrating a step that follows FIG. 5A and FIG. 5B.

Next, as shown in FIG. 6A and FIG. 6B, an insulating layer 16 of alumina, for example, having a thickness of about 3 to 4 μm is formed over the entire surface. The insulating layer 16 is then polished through CMP, for example, so that the pole portion layer 11a and the magnetic layer 11b are exposed, and the surface is flattened. Although the coil 15 is not exposed in FIG. 6A, the coil 15 may be exposed. If the coil 15 is exposed, an insulating film is formed to cover the coil 15.

Figures 7A, 7B:
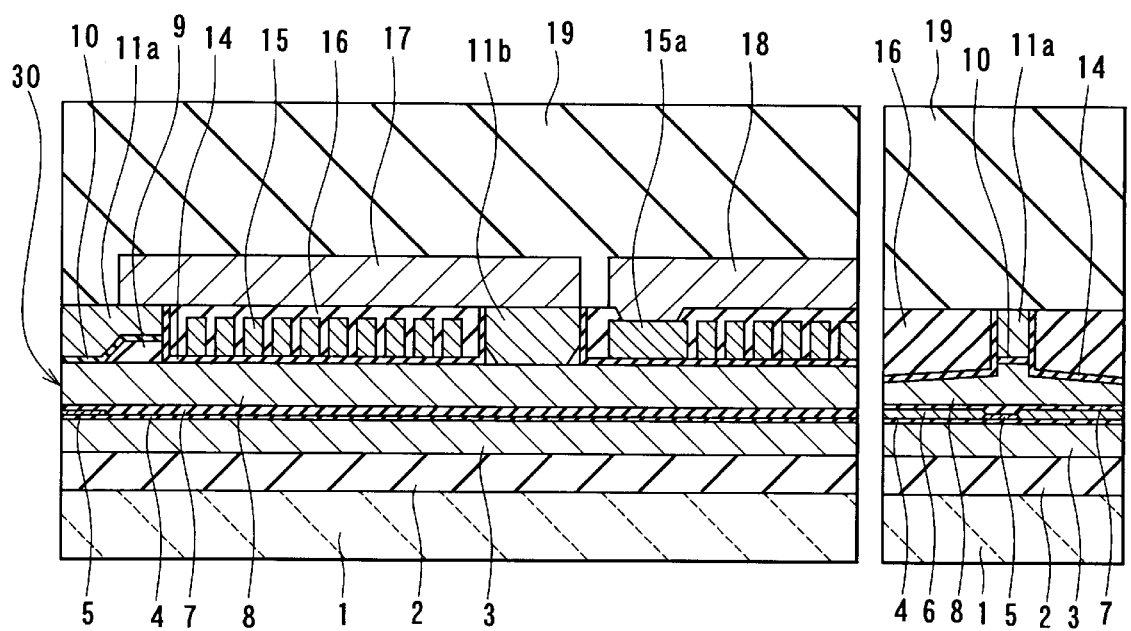
FIG. 7A and FIG. 7B are cross sections of the thin-film magnetic head fabricated through the method of the first embodiment.

Next, as shown in FIG. 7A and FIG. 7B, a portion of the insulating layer 16 located on the connecting portion 15a is etched to form a contact hole. A yoke portion layer 17 having a thickness of about 2 to 3 μm, for example, is formed to be a yoke portion of the top pole layer on the pole portion layer 11a, the insulating layer 16 and the magnetic layer 11b. At the same time, the conductive layer 18 having a thickness of about 2 to 3 μm, for example, and connected to the portion 15a is formed. The yoke portion layer 17 may be made of NiFe (80 weight % Ni and 20 weight % Fe), or NiFe (45 weight % Ni and 55 weight % Fe) as a high saturation flux density material and formed into a specific shape through plating or may be made of a material such as FeN or FeZrN as a high saturation flux density material through sputtering and then selectively etched through ion milling, for example, into the specific shape. Alternatively, a material such as CoFe or a Co-base amorphous material as a high saturation flux density material may be used. To improve the high frequency characteristic, the yoke portion layer 17 may be made of a number of layers of inorganic insulating films and magnetic layers of Permalloy, for example.

An end face of the yoke portion layer 17 facing toward the air bearing surface 30 is located at a distance of only 0.5 to 1.0 μm, for example, from the air bearing surface 30. In this embodiment, in particular, the end face of the yoke portion layer 17 is located near the zero throat height position.

Next, an overcoat layer 19 of alumina, for example, having a thickness of 20 to 40 μm, for example, is formed over the entire surface. The surface of the overcoat layer 19 is then flattened and pads (not shown) for electrodes are formed on the overcoat layer 19. Finally, lapping of the slider is performed to form the air bearing surfaces 30 of the thin-film magnetic head including the recording head and the reproducing head. The thin-film magnetic head is thus completed.

In this embodiment the bottom pole layer 8 corresponds to a first magnetic layer of the invention. The top pole layer made up of the pole portion layer 11a, the magnetic layer 11b and the yoke portion layer 17 corresponds to a second magnetic layer of the invention. The bottom shield layer 3 corresponds to a first shield layer of the invention. Since the bottom pole layer 8 also functions as the top shield layer, the bottom pole layer 8 corresponds to a second shield layer of the invention, too.

Figure 8:
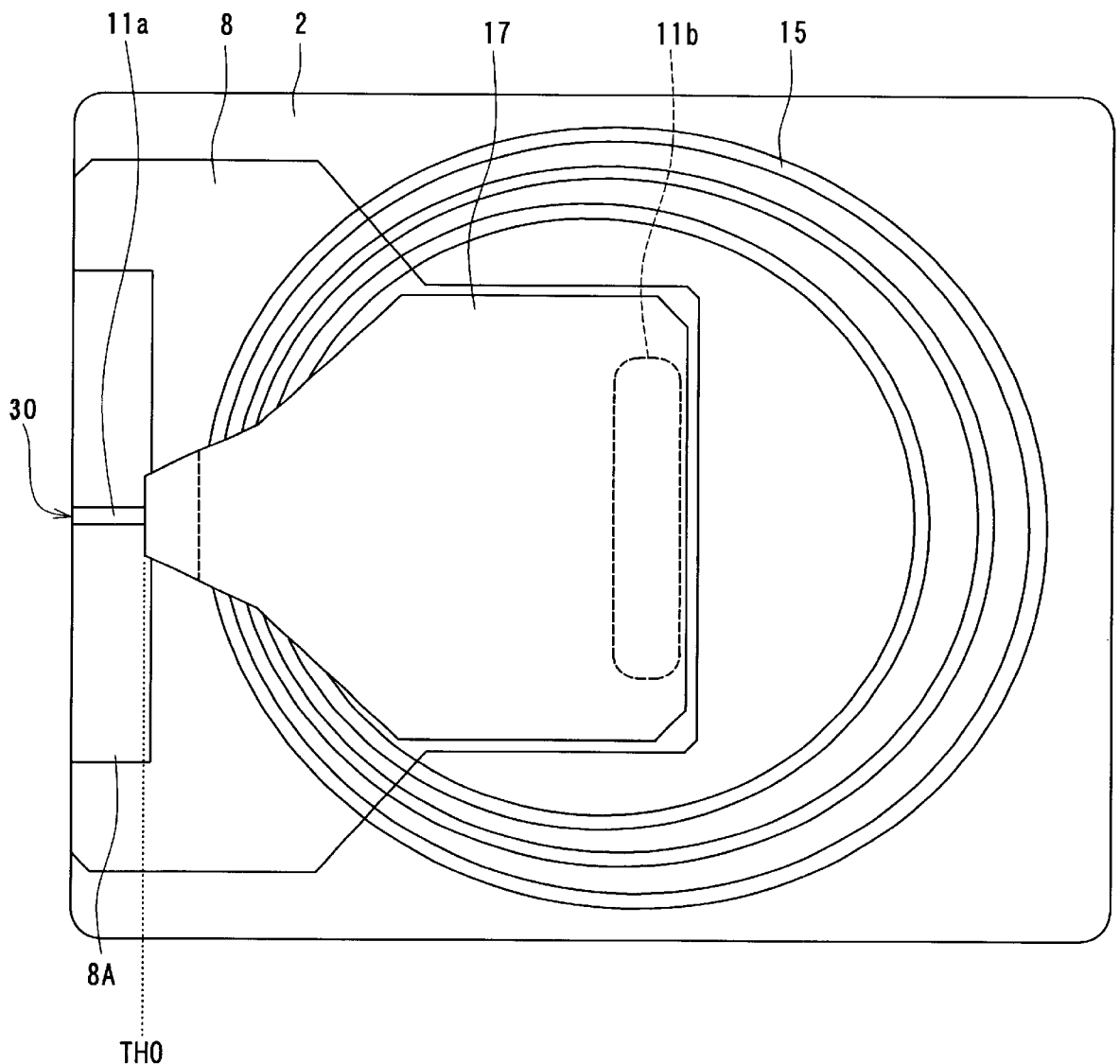
FIG. 8 is a top view of the thin-film magnetic head fabricated through the method of the first embodiment.

FIG. 8 is a top view of the thin-film magnetic head fabricated through the method of the embodiment, wherein the overcoat layer 19 is omitted and some of the other insulating layers and insulating films are omitted. In FIG. 8 'TH0' indicates the zero throat height position. Numeral 8A indicates the portion of the bottom pole layer 8 etched to make the trim structure. As shown in FIG. 8, the pole portion layer 11a of the top pole layer has a portion having a constant width equal to the recording track width. This portion extends from the air bearing surface 30 to a position corresponding to an end of the yoke portion layer 17 facing toward the air bearing surface 30. This portion of the pole portion layer 11a is the pole portion of the top pole layer. As thus described, the pole portion layer 11a defines the recording track width in this embodiment.

As described so far, the thin-film magnetic head fabricated through the method of the embodiment comprises the reproducing head and the recording head (the induction-type magnetic transducer). The reproducing head has: the MR element 5; and the bottom shield layer 3 and the top shield layer (bottom pole layer 8) for shielding the MR element 5. Portions of the bottom shield layer 3 and the top shield layer on a side of the medium facing surface (the air bearing surface 30) facing toward a recording medium are opposed to each other, the MR element 5 being placed between the portions.

The recording head has the bottom pole layer 8 and the top pole layer (including the pole portion layer 11a, the magnetic layer 11b and the yoke portion layer 17) magnetically coupled to each other, each of which includes at least one layer. The bottom pole layer 8 and the top pole layer include pole portions opposed to each other and placed in regions on a side of the medium facing surface. The recording head further has: the insulating layer 9 placed between the two pole layers and defining the throat height; the recording gap layer 10 placed between the pole portions of the pole layers; and the thin-film coil 15 at least a part of which is placed between the pole layers, the at least part of the coil being insulated from the pole layers.

In the embodiment the insulating layer 9 that defines the throat height is formed on the bottom pole layer 8. The pole portion layer 11a of the top pole layer is formed on the surface having a step caused by the insulating layer 9. It is difficult to form the pole portion layer 11a with accuracy if it is formed by frame plating, for example, on the surface having such a step.

In the embodiment, in contrast, the magnetic film 11 is formed on the surface having the step caused by the insulating layer 9. The top surface of the magnetic film 11 is flattened and the magnetic film 11 thus flattened is patterned through photolithography. The pole portion layer 11a is thereby formed. Patterning of the film having the flattened top surface through photolithography is performed with accuracy. As a result, according to the embodiment, the pole portion layer 11a that defines the recording track width is formed with accuracy. It is thereby possible to precisely control the recording track width even when the recording track width is reduced.

According to the embodiment, the thin-film coil 15 is placed on a side of the pole portion layer 11a. As a result, it is possible that an end of the coil 15 facing toward the air bearing surface 30 is placed near an end of the pole portion layer 11a. In the embodiment the thin-film coil 15 is formed on the flat insulating film 14. It is thereby possible to form the thin-film coil 15 of small dimensions with accuracy. In addition, the coil encasing portion 13 is formed through etching the insulating layer 9, so that it is possible to increase the thickness of the coil 15 and to reduce the line width thereof. As thus described, according to the embodiment, the yoke length is reduced by about 30 to 40 percent of that of a prior-art head, for example.

If a yoke portion layer is connected to a pole portion having a width equal to the recording track width and a length equal to the throat height, the cross-sectional area of the magnetic path abruptly decreases in the portion connecting the yoke portion layer to the pole portion. As a result, a magnetic flux may be saturated in this portion. This problem more frequently occurs when the throat height is small.

According to the embodiment, in contrast, an end of the pole portion layer 11a opposite to the air bearing surface 30 (that is, on the right side of FIG. 7A) is located farther from the air bearing surface 30 than the zero throat height position. As a result, relatively wide areas of the pole portion layer 11a and the yoke portion layer 17 are in contact and connected with each other. Therefore, according to the embodiment, it is impossible that the cross-sectional area of the magnetic path abruptly decreases in the portion connecting the yoke portion layer 17 to the pole portion layer 11a. As a result, saturation of a magnetic flux halfway through the magnetic path is prevented. According to the embodiment, it is thereby possible to utilize the magnetomotive force generated by the thin-film coil 15 for writing with efficiency.

As thus described, according to the embodiment, it is possible to provide a thin-film magnetic head having a recording head with an excellent high frequency characteristic, an excellent nonlinear transition shift (NLTS) characteristic and an excellent overwrite property that is a parameter indicating one of characteristics when data is written over existing data.

In this embodiment the end face of the yoke portion layer 17 facing toward the air bearing surface 30 is located at a distance from the air bearing surface 30 (that is, on the right side of the accompanying cross-sectional views). As a result, the embodiment prevents 'side write', that is, writing of data in a region of a recording medium where data is not supposed to be written. In the embodiment an end of the pole portion layer 11a opposite to the air bearing surface 30 is located farther from the air bearing surface 30 than the zero throat height position. Therefore, it is impossible that the cross-sectional area of the magnetic path abruptly decreases even though the end face of the yoke portion layer 17 facing toward the air bearing surface 30 is located at a distance from the air bearing surface 30 as described above.

According to the embodiment, the insulating layer 16 is provided to cover the thin-film coil 15 placed in the coil encasing portion 13. The top surface of the insulating layer 16 is flattened. It is therefore possible to form the yoke portion layer 17 with accuracy in the following step.

According to the embodiment, the insulating film 14 is provided between the bottom pole layer 8 and the thin-film coil 15. The insulating film 14 is a thin insulating film made of an inorganic material that achieves sufficient insulation strength. High insulation strength is thereby obtained between the bottom pole layer 8 and the coil 15.

In the embodiment the thin-film coil 15 is covered with the insulating layer 16 made of an inorganic insulation material. It is thereby possible to prevent the pole portion from protruding toward a recording medium due to expansion resulting from heat generated around the coil 15 when the thin-film magnetic head is used.

Second Embodiment

Reference is now made to FIG. 9A to FIG. 14A, FIG. 9B to FIG. 14B, and FIG. 15 to describe a method of manufacturing a thin-film magnetic head of a second embodiment of the invention. FIG. 9A to FIG. 14A are cross sections orthogonal to an air bearing surface. FIG. 9B to FIG. 14B are cross sections of a pole portion parallel to the air bearing surface.

The steps of the method of manufacturing the thin-film magnetic head of the second embodiment that are taken until the top shield gap film 7 is formed are similar to those of the first embodiment.

In the following step of the second embodiment, as shown in FIG. 9A and FIG. 9B, the bottom pole layer 8 having a thickness of about 2.5 to 3.5 $\mu$m, for example, is selectively formed on the top shield gap film 7.

Next, as shown in FIG. 10A and FIG. 10B, an insulating layer 20 made of alumina, for example, and having a thickness of 4 to 5 $\mu$m, for example, is formed over the entire surface. The insulating layer 20 is then polished through CMP, for example, until the bottom pole layer 8 is exposed, and the surface is flattened.

The following steps performed until the etching masks 12a and 12b are formed are similar to those of the first embodiment. First, the insulating layer 9 of alumina, for example, having a thickness of about 1 to 2 $\mu$m is formed over the entire surface. Next, portions of the insulating layer 9 are etched through RIE, for example. One of the portions is located in a region where the pole portion is to be formed. The other portion is located in a region corresponding to the center portion of the thin-film coil. Each of ends of the insulating layer 9 formed through this etching is tapered. This tapered portion forms an angle of 30 to 45 degrees with respect to the top surface of the bottom pole layer 8, for example.

Next, the recording gap layer 10 made of an insulating material whose thickness is 0.15 to 0.25 $\mu$m, for example, is formed over the entire surface. Next, a portion of the recording gap layer 10 located in the region corresponding to the center portion of the thin-film coil is etched to form a contact hole for making the magnetic path.

Next, the magnetic film 11 made of a magnetic material and having a thickness of about 3.5 to 4.5 $\mu$m, for example, is formed over the entire surface. The magnetic film 11 is provided for forming the pole portion of the top pole layer.

Next, as shown in FIG. 11A and FIG. 11B, the top surface of the magnetic film 11 is flattened. This flattening process may be performed through CMP using a slurry including alumina.

Next, the etching masks 12a and 12b are formed in the portion where the pole portion of the top pole layer is to be formed and in the portion where the top pole layer is connected to the bottom pole layer 8, respectively.

Next, the magnetic film 11 is etched through the use of the etching masks 12a and 12b by ion milling using an argon-base gas, for example, to form the pole portion layer 11a making up the pole portion of the top pole layer, and the magnetic layer 11b connected to the bottom pole layer 8, as shown in FIG. 12A and FIG. 12B. When the magnetic layer 11 is etched in this embodiment, the insulating layer 9 is not etched, but the portion of the recording gap layer 10 located in the region where the thin-film coil is to be formed is only etched, which is different from the first embodiment.

Next, the etching masks 12a and 12b are removed. The recording gap layer 10 is then selectively etched through dry etching, using the pole portion layer 11a as a mask. Next, the bottom pole layer 8 is selectively etched by about 0.3 to 0.4 μm, using the pole portion layer 11a as a mask, through ion milling using an argon-base gas, for example. A trim structure as shown in FIG. 12B is thus formed.

Next, a first layer 21 of the thin-film coil made of copper, for example, is formed by a method such as frame plating on the insulating layer 9. For example, the thickness of the first layer 21 of the coil is about 1.0 to 2.0 μm and the pitch is 1.2 to 2.0 μm. The first layer 21 is wound around the magnetic layer 11b. In FIG. 12A numeral 21a indicates a portion for connecting the first layer 21 to a second layer of the coil described later.

Figures 13A, 13B:
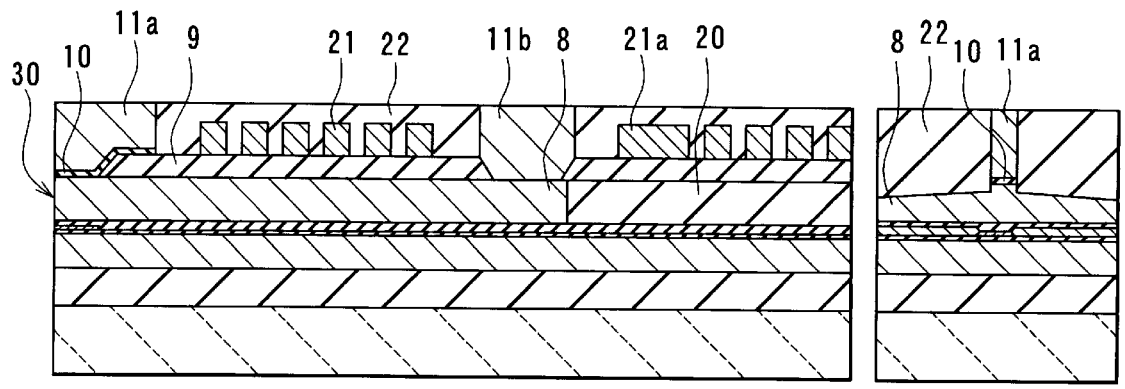
FIG. 13A and FIG. 13B are cross sections for illustrating a step that follows FIG. 12A and FIG. 12B.

Next, as shown in FIG. 13A and FIG. 13B, an insulating layer 22 of alumina, for example, having a thickness of about 3 to 4 μm is formed over the entire surface. The insulating layer 22 is then polished through CMP, for example, so that the pole portion layer 11a and the magnetic layer 11b are exposed, and the surface is flattened. Although the first layer 21 of the coil is not exposed in FIG. 13A, the first layer 21 may be exposed. If the first layer 21 is exposed, an insulating film is formed to cover the first layer 21.

Figures 14A, 14B:
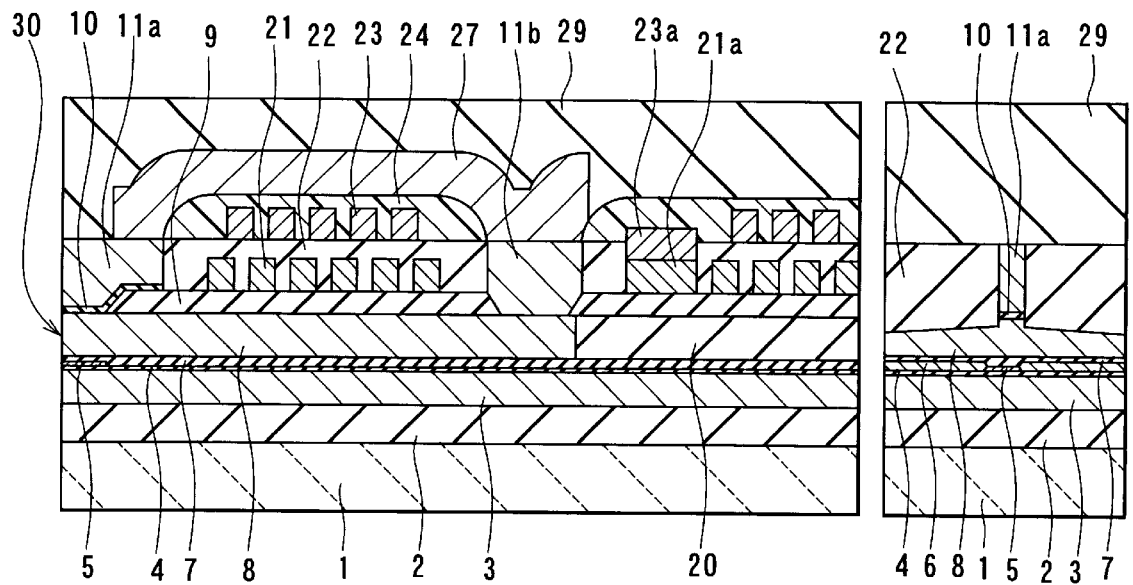
FIG. 14A and FIG. 14B are cross sections of the thin-film magnetic head fabricated through the method of the second embodiment.

Next, as shown in FIG. 14A and FIG. 14B, a portion of the insulating layer 22 located on the connecting portion 21a is etched to form a contact hole. Next, a second layer 23 of the thin-film coil made of copper, for example, is formed by a method such as frame plating on the insulating layer 22. For example, the thickness of the second layer 23 of the coil is about 1.0 to 2.0 μm and the pitch is 1.2 to 2.0 μm. In FIG. 14A numeral 23a indicates a portion for connecting the second layer 23 to the portion 21a of the first layer 21 of the coil through the contact hole.

Next, a photoresist layer 24 of a specific shape is formed on the insulating layer 22 and the second layer 23 of the coil. Next, a yoke portion layer 27 having a thickness of about 2.0 to 3.0 μm, for example, is formed to be a yoke portion of the top pole layer on the pole portion layer 11a, the photoresist layer 24 and the magnetic layer 11b. The yoke portion layer 27 may be made of NiFe (80 weight % Ni and 20 weight % Fe), or NiFe (45 weight % Ni and 55 weight % Fe) as a high saturation flux density material and formed into a specific shape through plating or may be made of a material such as FeN or FeZrN as a high saturation flux density material through sputtering and then selectively etched through ion milling, for example, into the specific shape. Alternatively, a material such as CoFe or a Co-base amorphous material as a high saturation flux density material may be used. To improve the high frequency characteristic, the yoke portion layer 27 may be made of a number of layers of inorganic insulating films and magnetic layers of Permalloy, for example.

An end face of the yoke portion layer 27 facing toward the air bearing surface 30 is located at a distance of only 0.5 to 1.0 μm, for example, from the air bearing surface 30. In this embodiment, in particular, the end face of the yoke portion layer 27 is located near the zero throat height position.

Next, an overcoat layer 29 of alumina, for example, having a thickness of 20 to 40 μm, for example, is formed over the entire surface. The surface of the overcoat layer 29 is then flattened and pads (not shown) for electrodes are formed on the overcoat layer 29. Finally, lapping of the slider is performed to form the air bearing surfaces 30 of the thin-film magnetic head including the recording head and the reproducing head. The thin-film magnetic head is thus completed.

Figure 15:
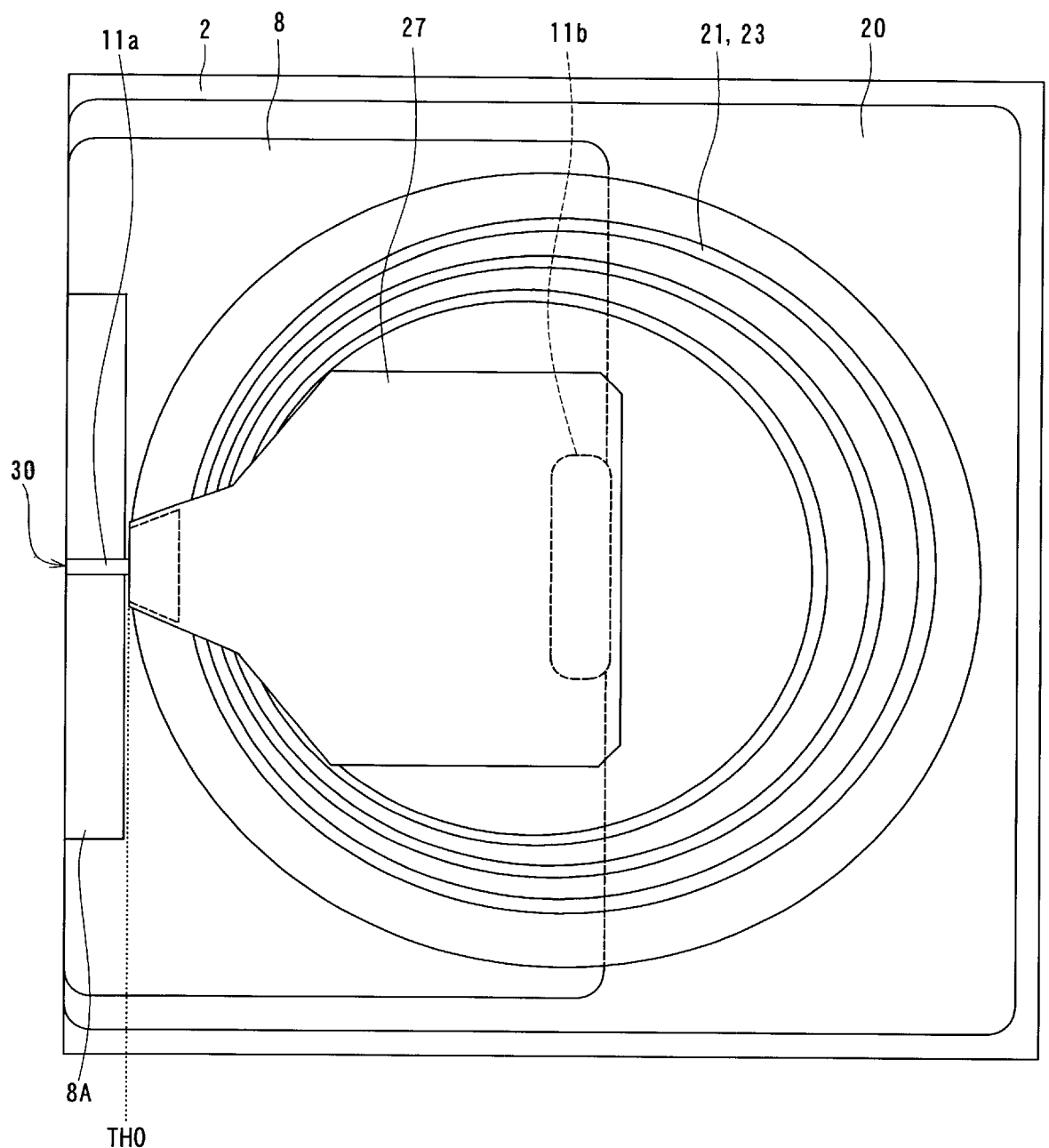
FIG. 15 is a top view of the thin-film magnetic head fabricated through the method of the second embodiment.

FIG. 15 is a top view of the thin-film magnetic head fabricated through the method of the embodiment, wherein the overcoat layer 29 is omitted and some of the other insulating layers and insulating films are omitted.

In this embodiment the top pole layer made up of the pole portion layer 11a, the magnetic layer 11b and the yoke portion layer 27 corresponds to the second magnetic layer of the invention.

In the embodiment the second layer 23 of the thin-film coil is formed on the flattened insulating layer 22. It is thereby possible to form the second layer 23 of small dimensions with accuracy.

The remainder of the configuration, functions and effects of the embodiment are similar to those of the first embodiment.

Third Embodiment

Reference is now made to FIG. 16A to FIG. 20A and FIG. 16B to FIG. 20B to describe a method of manufacturing a thin-film magnetic head of a third embodiment of the invention. FIG. 16A to FIG. 20A are cross sections orthogonal to an air bearing surface. FIG. 16B to FIG. 20B are cross sections of a pole portion parallel to the air bearing surface.

The steps of the method of manufacturing the thin-film magnetic head of the third embodiment that are taken until the magnetic film 11 is formed are similar to those of the first embodiment.

In the following step of the third embodiment, as shown in FIG. 16A and FIG. 16B, without flattening the top surface of the magnetic film 11, a masking film 32 having a thickness of 2 to 3 μm, for example, is formed on the magnetic film 11. The masking film 32 is made of a material for making etching masks, such as alumina. When the masking film 32 is formed, the top surface thereof has asperities resulting from the insulating layer 9.

Next, as shown in FIG. 17A and FIG. 17B, the top surface of the masking film 32 is flattened so as to remove the asperities therein. This flattening process may be performed through CMP using a slurry including alumina.

Figures 18A, 18B:
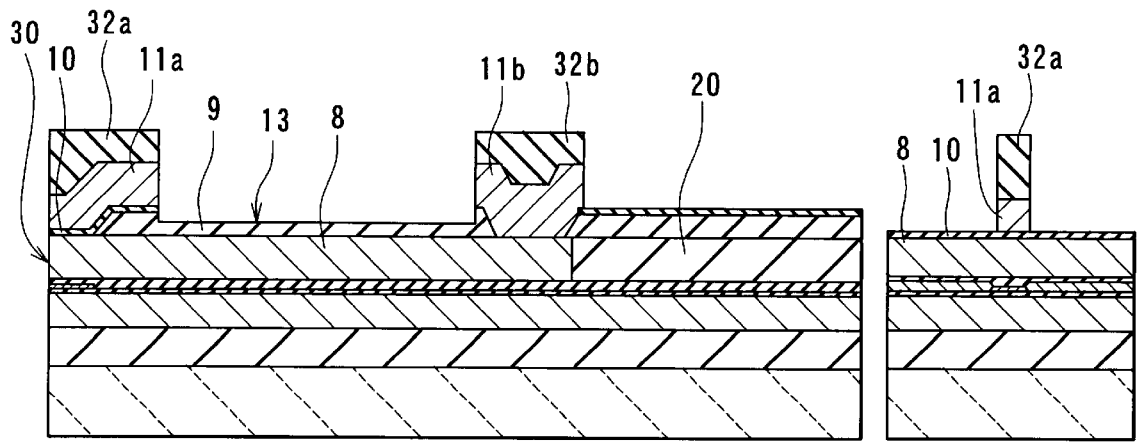
FIG. 18A and FIG. 18B are cross sections for illustrating a step that follows FIG. 17A and FIG. 17B.

Next, as shown in FIG. 18A and FIG. 18B, the flattened masking film 32 is patterned through photolithography to form the etching masks 32a and 32b used for making the magnetic film 11 into the pole portion layer 11a and the magnetic layer 11b of the top pole layer. Next, the magnetic film 11 is etched through the use of the etching masks 32a and 32b by ion milling using an argon-base gas, for example, to form the pole portion layer 11a and the magnetic layer 11b.

When the magnetic layer 11 is etched in this embodiment, portions of the recording gap layer 10 and the insulating layer 9 located in the region where a thin-film coil described later is to be formed are etched to form the coil encasing portion 13 in which the thin-film coil is placed.

Figures 19A, 19B:
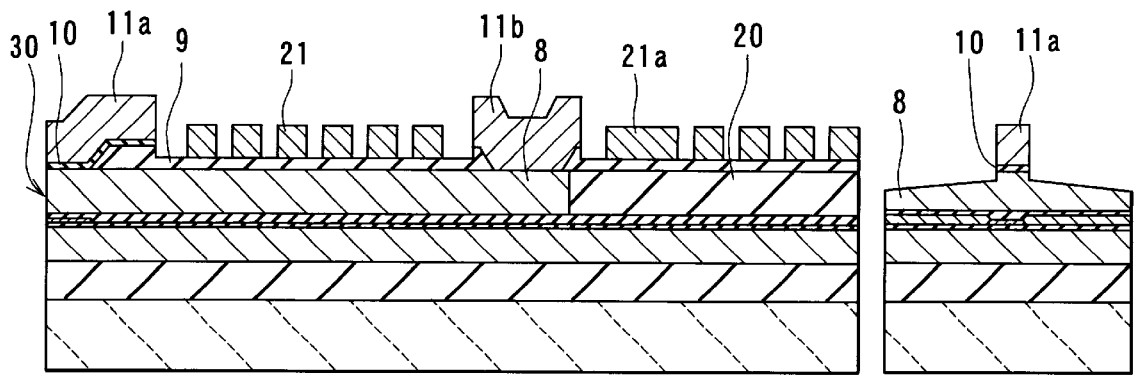
FIG. 19A and FIG. 19B are cross sections for illustrating a step that follows FIG. 18A and FIG. 18B.
Figures 24A, 24B:
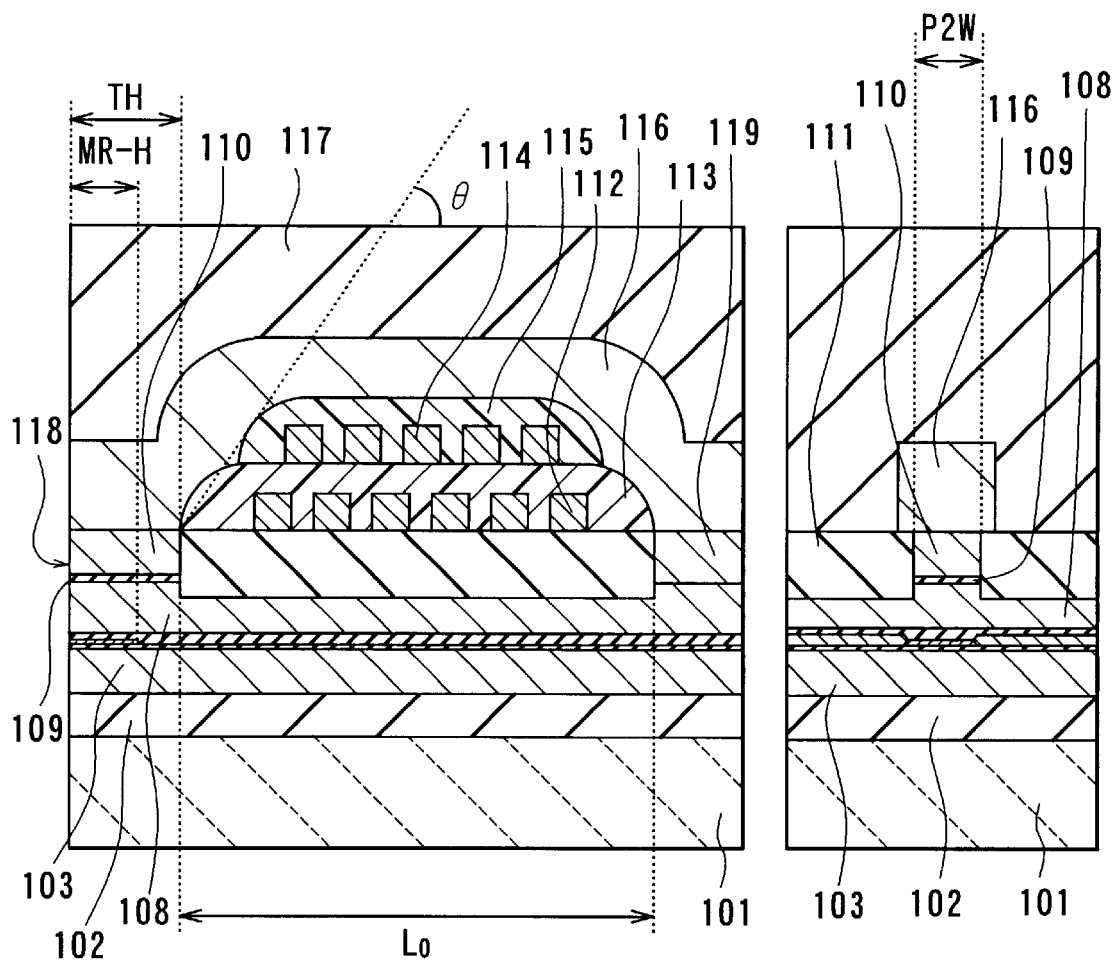
FIG. 24A and FIG. 24B are cross sections for illustrating a step that follows FIG. 23A and FIG. 23B.
Figure 25:
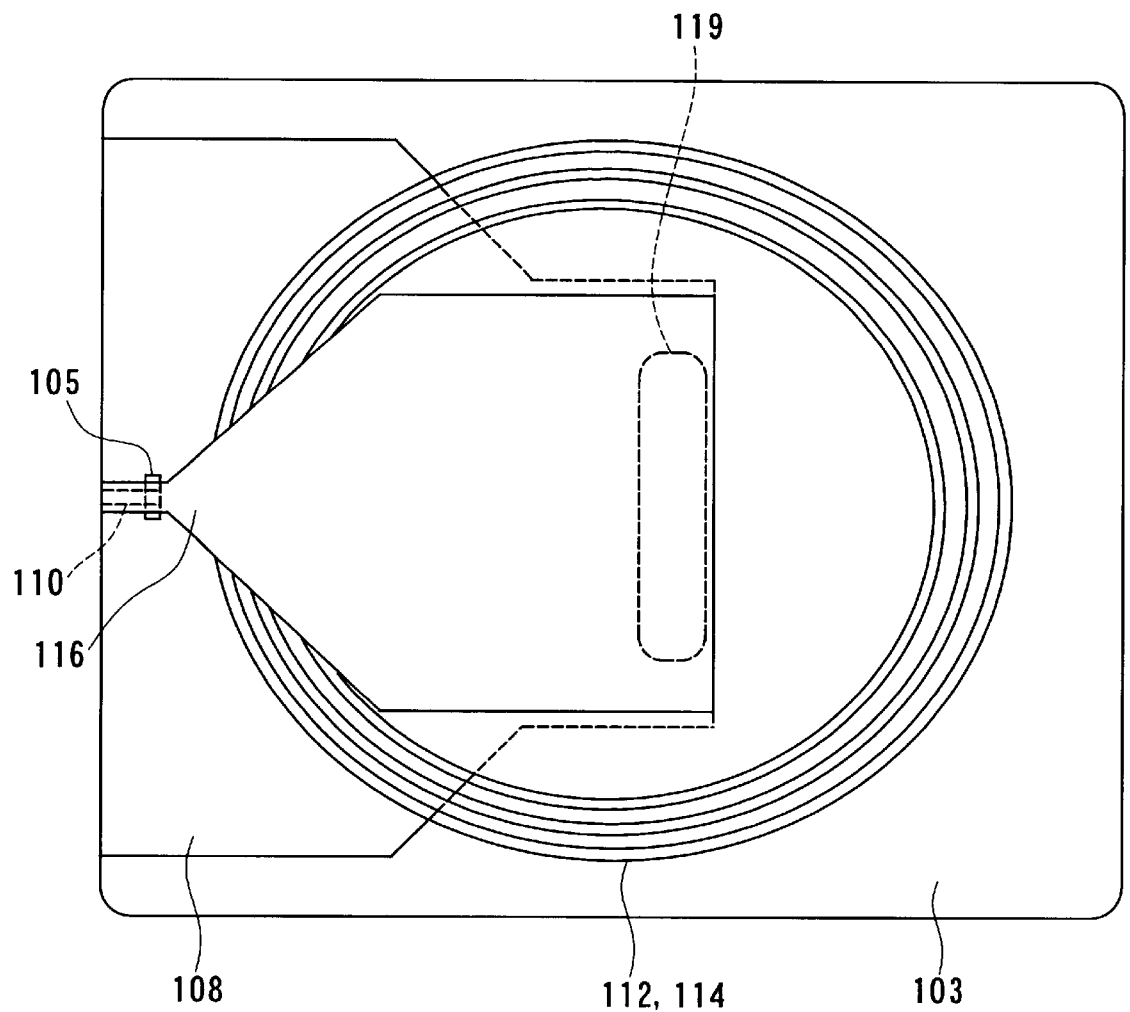
FIG. 25 is a top view of the related-art thin-film magnetic head.

Next, as shown in FIG. 19A and FIG. 19B, the etching masks 32a and 32b are removed. The recording gap layer 10 is then selectively etched through dry etching, using the pole portion layer 11a as a mask. Next, the bottom pole layer 8 is selectively etched by about 0.3 to 0.4 µm, using the pole portion layer 11a as a mask, through ion milling using an argon-base gas, for example. A trim structure as shown in FIG. 19B is thus formed.

Next, the first layer 21 of the thin-film coil made of copper, for example, is formed by a method such as frame plating on the insulating layer 9. For example, the thickness of the first layer 21 of the coil is about 1.0 to 2.0 µm and the pitch is 1.2 to 2.0 µm. The first layer 21 is wound around the magnetic layer 11b. In FIG. 19A numeral 21a indicates a portion for connecting the first layer 21 to a second layer of the coil described later.

Next, as shown in FIG. 20A and FIG. 20B, the insulating layer 22 of alumina, for example, having a thickness of about 3 to 4 µm is formed over the entire surface. The insulating layer 22 is then polished through CMP, for example, so that the pole portion layer 11a and the magnetic layer 11b are exposed, and the surface is flattened. Although the first layer 21 of the coil is not exposed in FIG. 20A, the first layer 21 may be exposed. If the first layer 21 is exposed, an insulating film is formed to cover the first layer 21.

Next, a portion of the insulating layer 22 located on the connecting portion 21a is etched to form a contact hole. Next, the second layer 23 of the thin-film coil made of copper, for example, is formed by a method such as frame plating on the insulating layer 22. For example, the thickness of the second layer 23 of the coil is about 1.0 to 2.0 µm and the pitch is 1.2 to 2.0 µm. In FIG. 20A numeral 23a indicates a portion for connecting the second layer 23 to the portion 21a of the first layer 21 of the coil through the contact hole.

Next, the photoresist layer 24 of a specific shape is formed on the insulating layer 22 and the second layer 23 of the coil. Next, the yoke portion layer 27 having a thickness of about 2.0 to 3 µm, for example, is formed to be a yoke portion of the top pole layer on the pole portion layer 11a, the photoresist layer 24 and the magnetic layer 11b.

An end face of the yoke portion layer 27 facing toward the air bearing surface 30 is located at a distance of only 0.5 to 1.0 µm, for example, from the air bearing surface 30. In this embodiment, in particular, the end face of the yoke portion layer 27 is located near the zero throat height position.

Next, the overcoat layer 29 of alumina, for example, having a thickness of 20 to 40 µm, for example, is formed over the entire surface. The surface of the overcoat layer 29 is then flattened and pads (not shown) for electrodes are formed on the overcoat layer 29. Finally, lapping of the slider is performed to form the air bearing surfaces 30 of the thin-film magnetic head including the recording head and the reproducing head. The thin-film magnetic head is thus completed.

A top view of the thin-film magnetic head fabricated through the method of the third embodiment is FIG. 15 as that of the head fabricated through the method of the second embodiment.

In the third embodiment the magnetic film 11 is formed on the surface having the step caused by the insulating layer 9. The masking film 32 is further formed on the magnetic film 11. The top surface of the masking film 32 is flattened and the masking film 32 thus flattened is patterned through photolithography. The etching masks 32a and 32b are thereby formed. In this embodiment the magnetic film 11 is patterned through the use of the etching masks 32a and 32b. The pole portion layer 11a is thereby formed. As a result, according to the embodiment, the etching masks 32a and 32b are patterned with accuracy. Therefore, the pole portion layer 11a that defines the recording track width is formed with accuracy. It is thereby possible to precisely control the recording track width even when the recording track width is reduced.

The remainder of the configuration, functions and effects of the embodiment are similar to those of the second embodiment.

The present invention is not limited to the foregoing embodiments but may be practiced in still other ways. In the foregoing embodiments, for example, the insulating layer 9 that defines the throat height is formed directly on the bottom pole layer 8. Alternatively, another layer, such as the recording gap layer 10, may be formed on the bottom pole layer 8, and the insulating layer 9 may be formed on the layer. Although the recording gap layer 10 extends over the insulating layer 9 in the foregoing embodiments, it is possible that the recording gap layer 10 does not extend over the insulating layer 9 but the magnetic film 11 is formed directly on the insulating layer 9.

In the foregoing embodiments the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element, too.

The invention may be applied to a thin-film magnetic head dedicated to writing that has an induction-type magnetic transducer only, or to a thin-film magnetic head performing writing and reading through an induction-type magnetic transducer.

According to the first method of manufacturing the thin-film magnetic head of the invention described so far, the magnetic film is formed on the insulating layer for defining the throat height and the gap layer. The top surface of the magnetic film is flattened. The magnetic film flattened is patterned through photolithography. At least the pole portion of the second magnetic layer is thereby formed. As a result, the pole portion of the second magnetic layer is formed with accuracy. It is thereby possible to precisely control the track width of the induction-type magnetic transducer even when the track width is reduced.

In the second method of the invention the magnetic film is formed on the insulating layer for defining the throat height and the gap layer. On the magnetic film the masking film is formed. The top surface of the masking film is flattened. The masking film flattened is then patterned through photolithography to form the etching mask. The magnetic film is patterned through the use of the etching mask, so that the magnetic film is made into at least the pole portion of the second magnetic layer. As a result, the pole portion of the second magnetic layer is formed with accuracy. It is thereby possible to precisely control the track width of the induction-type magnetic transducer even when the track width is reduced.

According to the first or second method of the invention, the second magnetic layer may be divided into the pole portion layer and the yoke portion layer, and an end face of the yoke portion layer that faces toward the medium facing surface may be located at a distance from the medium facing surface. In this case, it is further possible to prevent writing of data in a region where data is not supposed to be written.

According to the first or second method, the second magnetic layer may be divided into the pole portion layer and the yoke portion layer, and at least part of the thin-film coil may be placed on a side of the pole portion layer. In this case, it is possible to place an end of at least the part of the coil near an end of the pole portion layer. A reduction in the yoke length is thereby achieved.

The first or second method may further include formation of an additional insulating layer that covers the at least part of the coil placed on the side of the pole portion layer and has a surface facing the yoke portion layer, the surface being flattened together with a surface of the pole portion layer facing the yoke portion layer. In this case, it is possible to form the yoke portion layer with more accuracy.

According to the first or second method, the coil encasing portion may be formed by etching the insulating layer for defining the throat height. In this case, it is possible to increase the coil thickness and to reduce the line width of the coil. A reduction in the yoke length is thereby achieved.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a thin-film magnetic head comprising: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; an insulating layer for defining a throat height, the insulating layer being placed between the first and second magnetic layers; and a thin-film coil at least a part of which is placed between the first and second magnetic layers, the at least part of the coil being insulated from the first and second magnetic layers; the method including the steps of:

forming the first magnetic layer;

forming the insulating layer for defining the throat height on the first magnetic layer;

forming the gap layer on the pole portion of the first magnetic layer;

forming the second magnetic layer on the insulating layer for defining the throat height and the gap layer; and forming the coil such that the at least part of the coil is placed between the first and second magnetic layers, the at least part of the coil being insulated from the first and second magnetic layers; wherein the step of forming the second magnetic layer includes the steps of:

forming a magnetic film on the insulating layer for defining the throat height and the gap layer;

flattening a top surface of the magnetic film; and patterning the flattened magnetic film through photolithography to make the magnetic film into at least the pole portion of the second magnetic layer.

2. The method according to claim 1 wherein the pole portion of the second magnetic layer has a width equal to a track width.

3. The method according to claim 1 wherein, in the step of flattening the top surface of the magnetic film, asperities in the top surface of the magnetic film resulting from the insulating layer for defining the throat height are eliminated.

4. The method according to claim 1 wherein:

the step of forming the second magnetic layer includes the steps of: forming a pole portion layer including the pole portion of the second magnetic layer; and forming a yoke portion layer to be a yoke portion, the yoke portion layer being connected to the pole portion layer; and the step of forming the pole portion layer includes the steps of: forming the magnetic film; flattening the top surface of the magnetic film; and patterning the magnetic film.

5. The method according to claim 4 wherein an end face of the yoke portion layer that faces toward the medium facing surface is located at a distance from the medium facing surface in the step of forming the yoke portion layer.

6. The method according to claim 4 wherein the at least part of the thin-film coil is placed on a side of the pole portion layer in the step of forming the thin-film coil.

7. The method according to claim 6, further including the step of forming an additional insulating layer that covers the at least part of the coil placed on the side of the pole portion layer and has a surface facing the yoke portion layer, the surface being flattened together with a surface of the pole portion layer facing the yoke portion layer.

8. The method according to claim 4 wherein the step of patterning the magnetic film includes: formation of the pole portion layer by etching the magnetic film through the use of an etching mask; and formation of a coil encasing portion in which the at least part of the coil is placed, the coil encasing portion being formed by etching the insulating layer for defining the throat height through the use of the etching mask.

9. The method according to claim 1 wherein the top surface of the magnetic film is flattened through chemical mechanical polishing using a slurry including alumina in the step of flattening.

10. The method according to claim 1 wherein the gap layer is an alumina film formed through chemical vapor deposition.

11. The method according to claim 1, further including the step of forming: a magnetoresistive element; a first shield layer and a second shield layer for shielding the magnetoresistive element, portions of the first and second shield layers located in regions on a side of the medium facing surface being opposed to each other, the magnetoresistive element being placed between the portions of the shield layers; and a first insulating film placed between the magnetoresistive element and the first shield layer, and a second insulating film placed between the magnetoresistive element and the second shield layer.

12. The method according to claim 11 wherein at least one of the first and second insulating films is an alumina film formed through chemical vapor deposition.

13. A method of manufacturing a thin-film magnetic head comprising: a medium facing surface that faces toward a recording medium; a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; an insulating layer for defining a throat height, the insulating layer being placed between the first and second magnetic layers; and a thin-film coil at least a part of which is placed between the first and second magnetic layers, the at least part of the coil being insulated from the first and second magnetic layers; the method including the steps of:

forming the first magnetic layer;

forming the insulating layer for defining the throat height on the first magnetic layer;

forming the gap layer on the pole portion of the first magnetic layer;

forming the second magnetic layer on the insulating layer for defining the throat height and the gap layer; and forming the coil such that the at least part of the coil is placed between the first and second magnetic layers, the at least part of the coil being insulated from the first and second magnetic layers; wherein the step of forming the second magnetic layer includes the steps of:

forming a magnetic film on the insulating layer for defining the throat height and the gap layer;

forming a masking film on the magnetic film, the masking film being made of a material for making an etching mask;

flattening a top surface of the masking film;

forming an etching mask used for making the magnetic film into at least the pole portion of the second magnetic layer, the etching mask being formed by patterning the flattened masking film through photolithography; and patterning the magnetic film through the use of the etching mask to make the magnetic film into at least the pole portion of the second magnetic layer.

14. The method according to claim 13 wherein the pole portion of the second magnetic layer has a width equal to a track width.

15. The method according to claim 13 wherein, in the step of flattening the top surface of the masking film, asperities in the top surface of the masking film resulting from the insulating layer for defining the throat height are eliminated.

16. The method according to claim 13 wherein:

the step of forming the second magnetic layer includes the steps of: forming a pole portion layer including the pole portion of the second magnetic layer; and forming a yoke portion layer to be a yoke portion, the yoke portion layer being connected to the pole portion layer; and the step of forming the pole portion layer includes the steps of: forming the magnetic film; forming the masking film; flattening the top surface of the masking film; forming the etching mask; and patterning the magnetic film.

17. The method according to claim 16 wherein an end face of the yoke portion layer that faces toward the medium facing surface is located at a distance from the medium facing surface in the step of forming the yoke portion layer.

18. The method according to claim 16 wherein the at least part of the thin-film coil is placed on a side of the pole portion layer in the step of forming the thin-film coil.

19. The method according to claim 18, further including the step of forming an additional insulating layer that covers the at least part of the coil placed on the side of the pole portion layer and has a surface facing the yoke portion layer, the surface being flattened together with a surface of the pole portion layer facing the yoke portion layer.

20. The method according to claim 16 wherein the step of patterning the magnetic film includes: formation of the pole portion layer by etching the magnetic film through the use of the etching mask; and formation of a coil encasing portion in which the at least part of the coil is placed, the coil encasing portion being formed by etching the insulating layer for defining the throat height through the use of the etching mask.

21. The method according to claim 13 wherein the top surface of the masking film is flattened through chemical mechanical polishing using a slurry including alumina in the step of flattening.

22. The method according to claim 13 wherein the gap layer is an alumina film formed through chemical vapor deposition.

23. The method according to claim 13, further including the step of forming: a magnetoresistive element; a first shield layer and a second shield layer for shielding the magnetoresistive element, portions of the first and second shield layers located in regions on a side of the medium facing surface being opposed to each other, the magnetoresistive element being placed between the portions of the shield layers; and a first insulating film placed between the magnetoresistive element and the first shield layer, and a second insulating film placed between the magnetoresistive element and the second shield layer.

24. The method according to claim 23 wherein at least one of the first and second insulating films is an alumina film formed through chemical vapor deposition.

* * * * *